US009185063B1

(12) United States Patent
Kumar

(10) Patent No.: US 9,185,063 B1
(45) Date of Patent: Nov. 10, 2015

(54) SYSTEM AND METHOD FOR SHARING AND SYNCHRONIZATION OF INFORMATION WITHIN A SPECIFIED INFORMATION CONTEXT AMONG USERS WITH A MOBILE ELECTRONIC DEVICE

(71) Applicant: Ashish Kumar, Lewisville, TX (US)

(72) Inventor: Ashish Kumar, Lewisville, TX (US)

( * ) Notice: Subject to any disclaimer, the term of this patent is extended or adjusted under 35 U.S.C. 154(b) by 0 days.

(21) Appl. No.: 14/583,569

(22) Filed: Dec. 26, 2014

Related U.S. Application Data

(60) Provisional application No. 62/077,223, filed on Nov. 8, 2014.

(51) Int. Cl.
*G06F 15/16* (2006.01)
*H04L 12/58* (2006.01)

(52) U.S. Cl.
CPC .............. *H04L 51/046* (2013.01); *H04L 51/04* (2013.01); *H04L 51/043* (2013.01)

(58) Field of Classification Search
None
See application file for complete search history.

(56) References Cited

U.S. PATENT DOCUMENTS

| | | | | |
|---|---|---|---|---|
| 2002/0150147 | A1* | 10/2002 | Liang | 375/133 |
| 2003/0046296 | A1* | 3/2003 | Doss et al. | 707/102 |
| 2004/0068649 | A1* | 4/2004 | Haller et al. | 713/153 |
| 2004/0203659 | A1* | 10/2004 | Mikan | 455/414.1 |
| 2004/0215701 | A1* | 10/2004 | Vrajich | 709/201 |
| 2005/0114777 | A1* | 5/2005 | Szeto | 715/710 |
| 2007/0168447 | A1* | 7/2007 | Chen et al. | 709/207 |
| 2009/0247134 | A1* | 10/2009 | Jeide et al. | 455/414.2 |
| 2009/0282125 | A1* | 11/2009 | Jeide et al. | 709/217 |
| 2010/0098230 | A1* | 4/2010 | Bhow | 379/202.01 |
| 2011/0072091 | A1* | 3/2011 | Facemire et al. | 709/206 |
| 2012/0005283 | A1* | 1/2012 | Provo et al. | 709/206 |
| 2013/0046836 | A1* | 2/2013 | Tousignant et al. | 709/206 |
| 2013/0059570 | A1* | 3/2013 | Hara et al. | 455/414.1 |

* cited by examiner

*Primary Examiner* — Brian P Whipple
(74) *Attorney, Agent, or Firm* — Twentyseven Patents LLC; Gustavo M. Marin

(57) ABSTRACT

Mechanism of interactively sharing, synchronization and control of information among users with different electronic contact types, using internet network based communication between a client application on the mobile electronic device and a server device, are described. As an example, a host can send invitation for a calendar event to other users whose contact type may be email address, phone number, a social media account with a single client application on the mobile device. Mechanism for the synchronization also allow for calendar event information on different client devices to be automatically synchronized. Identifiers may be automatically used by a synchronization mechanism implemented by a service. Identifiers may include user identifier, event identifier, information context identifier, device identifier or other identifiers. Messages, data structures and protocols between client devices and server to create, update, delete and respond to information data more specifically related to a calendar event are described. A mechanism to establish a direct communication link for exchanging instant messages among participants of an information context related to a calendar event using client device, server service and identifiers is also described.

16 Claims, 23 Drawing Sheets

SYSTEM AND METHOD FOR SHARING AND SYNCHRONIZATION OF INFORMATION WITHIN A SPECIFIED INFORMATION CONTEXT AMONG USERS WITH A MOBILE ELECTRONIC DEVICE

CROSS-REFERENCE TO RELATED APPLICATIONS

This application claims the benefit of U.S. Provisional Application No. 62/077,223 filed on Nov. 8, 2014.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Technical Field

The present invention relates to system and methods for managing the information using a network-connected electronic device. More specifically it relates to managing the shared information using context based network communication in mobile electronic devices.

2. Background Art

Mobile electronic devices, for example, smartphones, Personal Digital Assistants (PDA's), music players, tablets and smartwatches are becoming more sophisticated and technologically advanced with each passing day. The various other features of the mobile electronic device include, but are not limited to, GPS (Global Positioning System), Camera, Audio/Video player, FM radio, Music player, heart-rate monitor, and short range wireless communication. Mobile devices can also connect to a network and can be uniquely identified using, for example, MAC (Media Access Control) address, IMEI (International Mobile Equipment Station Identity) number and/or operating system specific identifiers for a given mobile device. With an increase in on-device computational and storage capabilities, new electronic devices are capable of executing complex tasks. Nowadays, the mobile electronic devices are enabled typically with a plurality of applications. For example, smartphones along with enabling wireless communication also provide various other applications.

Hence, the use of mobile devices has increased significantly in day-to-day life because of the presence of the plurality of new applications, sometimes referred to as "apps". Today, the mobile devices are also enabled with enhanced applications. For example, the mobile phones enable users to edit and modify audio/video data and multimedia data present in the mobile phones using audio/video applications. The users of electronic mobile devices today have multiple types of electronic communication addresses such as email address for email exchange, wireless phone number for SMS (Short Messaging Service) and MMS (Multimedia Messaging Service), social media accounts all accessible on the mobile electronic device. The users can also create an event using existing calendar application and send that event invitation to other users.

However, one limitation of existing information sharing applications is that the sharing of information is limited to one electronic communication contact address type. So email application is required to contact a user using email address contact type, a messaging application is required to contact a user with phone number contact type et cetera. These limitations are apparent even more in existing calendar applications that allow users to send and share information related to a calendar event. Existing calendar applications have a limitation that the event invitation can be sent to other users using only their email address as the contact type. Whereas, electronic device users today have multiple contact types, for example, email address, phone number and user accounts for social media websites such as Facebook™ and Twitter™. Existing calendar applications do not allow users to send invitations simultaneously to multiple users from the contact list using heterogeneous contact types, for example, email address, phone number and Facebook™ account. Furthermore, existing calendar applications do not intelligently customize the invitation message and the method of communication based on the contact type. For example, invitation message cannot automatically be delivered using email for the invitees with contact type of an email address, using SMS (Short Message Service) for the invitees with a contact type of phone number and using instant message service for the invitees with a Facebook™ account contact type et cetera.

Another limitation of exiting calendar applications is that they do not provide any mechanism to establish a secure and private communication link among the users associated with an event, for example, sending and receiving event invitations and event responses, updating event information and sharing instant messages within the context of a given event. Any replies and updates sent by event host and invitees are sent as email or in some limited cases as SMS messages to other parties of the event. Where the receiving party has to manually open the email or SMS to check for the updates. This process creates the possibility of some invitees and/or host ignoring some important updates related to the calendar event.

Still another limitation of existing calendar applications is that they require the event host to know the contact information of the invitees beforehand to send an invitation for the event. Therefore, users of existing calendar applications on mobile device cannot create an open event or appointment where another user can join the calendar event without the host knowing the contact information of such user beforehand. Further, existing calendar applications do not provide a mechanism to set and verify the conditions for credentials or attributes of other users allowed to join an open event, for example, only users belonging to a specific graduation year from an educational institute, only users residing in a community et cetera.

Another limitation of existing calendar applications is that they rely on sending email messages with attachments if the user wants to share a file such as a document, video, voice, picture and/or other types of data with other guests of the event. However, if the host later wants to share an updated version of the file or another type of data itself, then another event update email is sent to the guests. So guests receive two emails with two different attachments for the same event. This method of information sharing is not optimal in mobile device environment where data transfer over the network is expensive and limited in bandwidth. So for example, if a host user sent an invitation with a video message attached in the invitation email then the host user cannot directly modify that video message at a later time. If the user wants invitees to see a newer video message for the event invitation then the user will have to send another invitation email with the new video message to all the invitees. So, in this case invitees will receive two emails from the user with two different video messages. Thus invitee users have to manually decide as to which video message should be treated as the most up to date video message from the host user. And invitees' manual decision-making process might dependent on the order in which they received email updates from the calendar user. The order of email delivery may not always be guaranteed to be the same for all invitees due to varying network speeds and latency of email service itself.

Still another limitation of existing calendar applications is that they do not provide any mechanism for the users to directly control how much and what information related to a calendar event is displayed to the other user associated with an event. For example, if a user wants only some guests to see the video message and other guests to not see the video message then current calendar applications do not provide any such control mechanism for the files attached to a calendar event.

Still another limitation of the existing calendar applications in mobile devices is that they require user to know the exact address of the event location. Existing calendar applications do not provide any functionality to the user to search for event address based on a text search criterion, for example, searching for "Restaurant", "Pub", "Bar", "Coffee shop" et cetera. So a user has to first search for such places using a mapping application on the mobile device or through another mechanism, find the address and then enter that address in the event location field of the calendar application of the mobile device.

Still another limitation of the existing calendar applications in mobile devices is that there is no provision for a user to update the event information remotely for other users in such manner as to minimize the network traffic. So for example, if the host user changes the location of the event then event information at the guest should update only the event location. However, existing calendar applications require the host to send a new email message to all guests with the updated event information that requires guests to download all the information related to the event again.

Hence there exists a need in the art for a method and system that efficiently and effectively manages the sharing, synchronization and control of shared information within a context among mobile device users who may have multiple contact addresses capable of electronic communication. Furthermore, there exists a need in the art for a method and system that manages sharing, synchronization and control of shared information specifically within the context of planning a calendar event; automatically keeps event information synchronized for all participants and allows event participants to have a direct communication link to exchange data in the context of the calendar event on a mobile communication device.

DISCLOSURE OF INVENTION

Accordingly, an aspect of the present invention is to provide a system and method for sharing, synchronization and control of shared information within an information sharing context using a mobile electronic device. Another aspect of the present invention is to provide a system and method for planning a calendar event efficiently and effectively by using a mobile electronic device. The preferred embodiment of the system uses a central controller and client application on the mobile electronic device connected to the internet network wherein central controller and client application exchange request and response messages over the network for sending and receiving information and messages related to a calendar event. Furthermore, in an exemplary embodiment, a method for planning an event using such client application in an electronic device preferably includes support for remote method invocation using the request and response messages to establish a direct communication link for sending and synchronization of event information among the host and invitees of the event.

The host and invitees of the event can have different contact types as long as such contact information is registered in the system. A user can create an account in the system by inputting a username and password and then associate his/her contact information, such as email addresses, phone numbers, Facebook™ account identifier et cetera with such account. The system will create a unique identifier for each user at the time of account creation. The client application on the mobile electronic device also provides a unique identifier for that device and sends it to the central controller. Such unique identifiers are then used for establishing a communication link among system users in the context of each event thus providing an effective abstraction of the heterogeneous contact types of each user within the system.

Furthermore, a user can create a new event by providing relevant information for the event, for example, date and time of the event, location of the event, along with optional messages for the invitees, for example, a video message, a picture, an audio message, a file for the invitees. The client application sends such information from the mobile device of the user to a central controller wherein central controller creates a unique identifier for the event in the system. The client application also creates a new event in the default calendar application of the mobile device and copies relevant fields of the event information to the corresponding fields of the new event in default calendar application. Central controller parses the received calendar event information to identify the contact information of each guest. Central controller then retrieves the associated mobile devices identifiers for each guest registered with the system and sends a message containing the event identifier to the client application on corresponding mobile electronic devices. Central controller and client application can also send messages containing the event identifier through conventional mechanism associated with each contact type for the guests. The central controller and client application automatically determine such conventional mechanism based on the contact information and other preferences for each event participant. Such automatic mechanism may use a conventional method to send an email message for guests with email contact type, a SMS (Short Messaging Service) message for guests with phone number contact type and an email message for guests with both email and phone number information but who prefer to receive email message as indicated in their system preferences et cetera.

Still another way for users to receive the calendar event information using the methods and system of this invention is when they start the client application on their mobile electronic device. Client application sends a request at the start time to the central controller to provide any new invitations or updates to existing invitations for the associated user. Central controller then validates the user information received in the request message. After successful validation, controller sends any new invitations or updates for existing invitations for that user to the client application. When the event guest users accept the invitation and respond to the host, then the client application provides a similar method for the event invitees to add that event to their respective default calendar application on their mobile devices. Client application copies all relevant fields of the event information to the corresponding fields of the new event in the default calendar application of the mobile device of the invitee.

Another aspect of the present invention is to allow user to create an event that other users in the system can search, view and join. In this case, user who creates the event does not necessarily have the contact information of other user who can later join the event. After joining the event, all the parties can exchange messages within the context of the event as permitted by the various parameters of the event. Event parameters provide a control of, for example, which user can send message to which user of the event, among other control features.

Still another aspect of this invention is to provide users a system and method for searching for the event location based on a text description rather than providing the exact address of the event location. The system then performs the location search using the GPS (Global Positioning System) and mapping application of the mobile electronic device, presents the result of the location search to the user and allows the user to select one location from the search results as the address of the event location. System also retrieves the positioning coordinates including latitude and longitude as well as the text address of such selected event location to send to invitees of the given calendar event.

Another aspect of the present invention is to provide a direct communication link between the client applications of host and invitees of the event using the user identifier for the host and invitees, using the device identifier for mobile electronic device associated with those users and using the event identifier for the corresponding event. The system provides an abstraction of the contact information of each user by using their user identifier instead of the personal contact information, for example, email address, phone number, Facebook™ account that are associated with the corresponding user identifier. The user database at the central controller, maintains device identifiers associated with each user identifier within the system that informs the central controller about sending any event related messages to the associated mobile electronic device.

Still another aspect of the present invention is to provide a method for the user to be able to control the display of event information elements to other users who are participants of a given event. For example, event host can control, by using various event parameters, which user can view the location of the event, time of the event, other guests of the event, files or attachments related to the event et cetera. The event display within the client application at the mobile device is accordingly modified to display the most recent information for the given event information element and for the given user. For example, if the event host user decides to update the video message contained within the event invitation, then host records the new video using the camera of the mobile device. Once the new video message for the event is uploaded to the central controller by the host, central controller then identifies all the users who are guests of the given event, determines the unique device identifiers for each guest and synchronizes and updates the event display to mark that event information has changed. In this case, video message itself is not sent to the guest in order to minimize the network traffic. When an event participant wants to view the video message attached to an event invitation by clicking or selecting the video message button or icon within the client application display, the client application sends a request to central controller for downloading the video message. Central controller automatically sends the latest video associated with the event in response to the client request. Similarly, if a video message for the event is deleted by the host, client application at the mobile device of the host sends a request to central controller to delete the event from the client application of participating guests. Central controller then identifies all the users who are guests of the given event and determines the unique device identifiers for the mobile device of each guest. Central controller then sends a request message to client application at mobile device associated with each device identifier to disable or hide the video message button or icon by updating the event display. In this case, only the video message part of the event is deleted to minimize the network traffic, all other event information is not synchronized.

Another aspect of the invention is that if the event host user removes a guest from the event guest list then application display at the mobile device for that guest automatically refreshes to remove the event from the client application display. Again, the event is deleted by sending a message from the central controller to the mobile device of the guest. Wherein client application at the mobile device of the guest handles the message by invoking a process to delete the event from device calendar, delete the event from application display and refresh the application display at the mobile device.

Still another aspect of the current invention is to provide a system and method for exchanging instant messages among the users who are participating in a given event. In this case, the client application on the mobile device of a participant user for a given event sends a message to the central controller containing information, for example, text, graphics, location, file, audio, video et cetera as provided by the user along with the user identifiers of the desired recipients and the event identifier of the given calendar event. Central controller validates the event identifier and user identifier and retrieves the associated device identifiers. Central controller sends a push notification to the client application at mobile devices associated with the device identifiers. When the user starts the client application next time, event information for the related event is updated to show the received instant message.

BRIEF DESCRIPTION OF DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
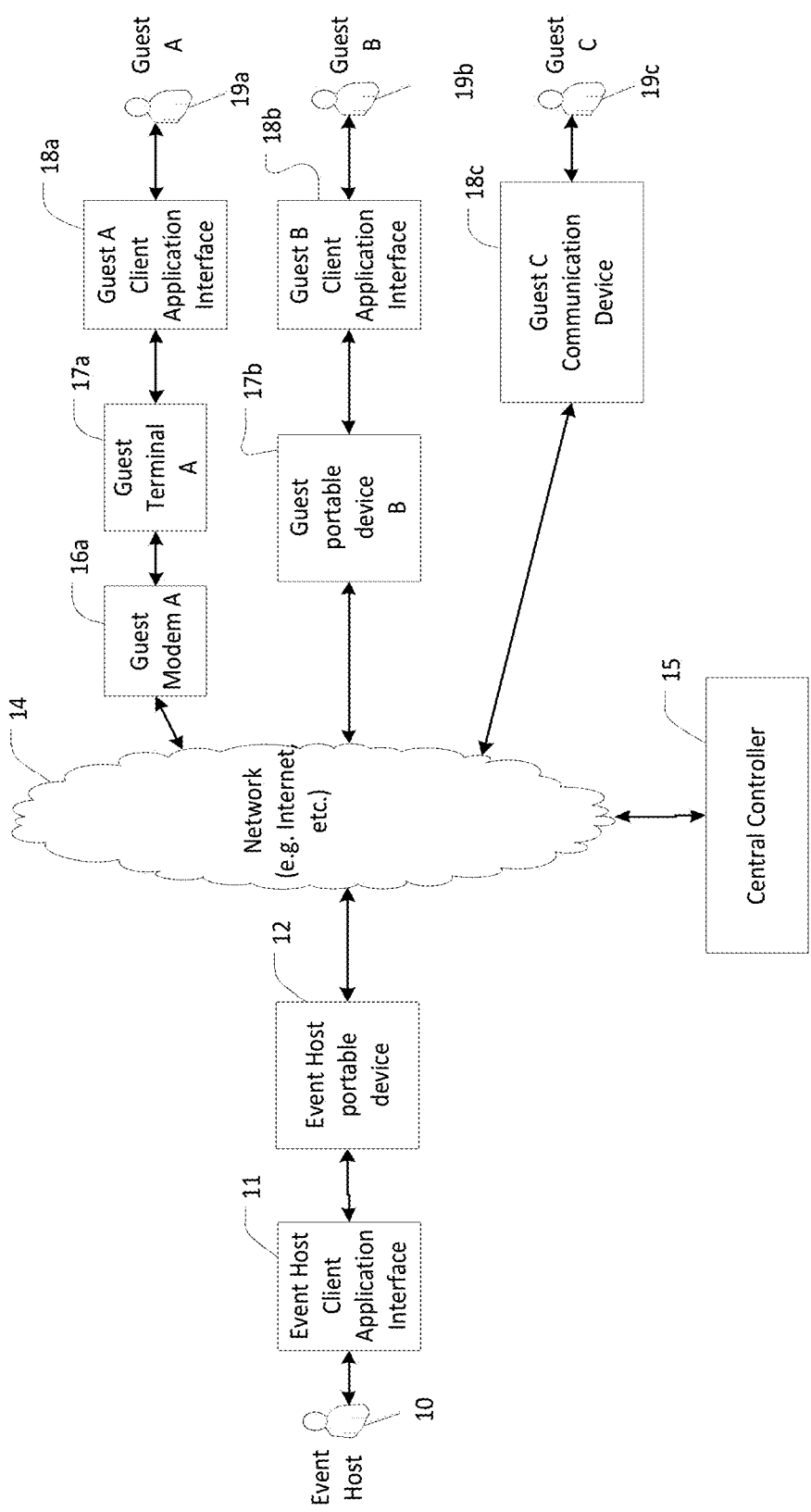
FIG. 1 shows the preferred embodiment of the overall system architecture.

Glossary of Terms Used in this Specification

As used herein the following terms have the meaning given below:

"Electronic Device" or "Mobile Device" or "Portable Device": These terms are used interchangeably and relate to any such mobile electronic device as, for example a cellular phone, PDA (Personal Digital Assistant), tablet, laptop, WebTV et cetera that is capable of connecting to a network and has additional components as described elsewhere in the following description "Information Elements" or "Data Field": A structured data format that is shared between central controller and client application so that the interpretation of data associated with the information element is common to both central controller and the client applications. The relevant data fields within the information element are stored either at a central controller computer or at the mobile electronic device storage.

"Information Context" or "Context": Refers to the identifying information attached to the data so that messages containing that data element can be identified and related to each other as the message relationship is determined and interpreted by the client application and central controller. An information context is created when a user sends a request to central controller to create a context for sharing information with other system users.

"Access Privilege": Describes the ability and permissions given to a user to modify the information and/or content related to a given information element within an information context. E.g. a user may have permissions to both view and modify the data within one information context. The same user may have permissions to only view the data within another information context. The user who requests central controller to create an information context can set the access privileges for the other users associated with that information context.

"Event": Describes a specific activity taking place at a given time, location etc. for which an identifier is created at the central controller and the mobile electronic device "Calendar Event": Describes an event that has an associated entry in the calendar application of the mobile electronic device "Host" or "Event host": describes a person, user or party that provides the specific information of the event at the time the information context for the event was first created "Guests" or "Invitees": Relates to the users who are added as a contact party for a given calendar event except the host of the event "Even participants": Any user who is either the host or guest of a given event "Open Event": Related to an event that has been created without and specific guest list and has some attributes set in the event information that allows other system users to proactively join the event later.

"Instant Message": Data sent and received by the users in the form of text messages, multimedia messages including audio, video and/or pictures, location coordinates, webpages et cetera containing information elements of sender, recipient(s) and associated information context.

DESCRIPTION

This invention involves novel methods, system, message formats, and data structures for establishing a communication link for mobile electronic devices of the users to manage a calendar event by synchronizing event information and instant message exchange. The following description is presented to enable one skilled in the art to make and use the invention, and is provided in the context of particular applications and their requirements. Various modifications to the disclosed embodiment will be apparent to those skilled in the art, and the general principals set forth below may be applied to other embodiments and applications. Thus, the present invention is not intended to be limited to the embodiments shown and the inventor regards this invention as any patentable subject matter described herein.

The system of the invention consists of a central controller that connects the mobile electronic devices of users in the context of an event. In the preferred embodiment of this invention, users communicate with the central controller using a client application on the mobile electronic device. Central controller and the client application exchange request and response messages over the electronic communication network that allows remote method invocation based on the request and response messages.

An overall diagram of one exemplary embodiment of the invention is shown in FIG. 1. In general the system architecture connects mobile electronic devices of the event host and event guest users by means of a central controller and a client application residing on the mobile electronic device. The event host user 10 sends an event invitation to guests that are designated 19a to 19c and are collectively referred as guest users 19. Event host and guests connect to the central controller 15 via a network 14. There can be many hosts and many guests; however, the actual number of hosts and guests is not relevant so long as there is at least one host and one guest. Host 10 and guests 19 may use different online communication interfaces to communicate with the central controller. Typically, but not necessarily communication is via the Internet.

Guest terminal 17A can be any such electronic device as a typical computer, WebTV et cetera that can connect to the modem 16A to access the Internet. Event host 10 connects to the central controller 15 via a mobile electronic device 11 and guest 19A connects to the central controller via a webpage interface 18A. Webpage 18A is loaded on terminal 17A using applications such as Microsoft Internet Explorer, Mozilla Firefox, Apple Safari, Google Chrome etc. Webpage interface 18A may use hypertext transfer protocol secure (HTTPS), secure file transfer protocol (SFTP) et cetera to communicate with controller 15 using secure message transmission. The connection between buyer or seller terminal client and central controller server may be a secured connection using Transport Layer Security (TLS), Secure Socket Layer (SSL) or any other such cryptographic protocol that provides communication security over the internet.

Central controller 15 is also connected to the internet via an ISP. Similarly guest portable electronic device 17b can be any of the various types of devices such as laptops, smartphones, PDAs or any other device capable of communicating over the internet. Event host 10 and guest 19b connect to the central controller through the interface 18b. Interface 18b can be a dedicated application such as an iOS, Android, Windows or any other processor operating system based application running on the portable electronic devices 17b. Still another type of invitee user 19c communicates directly with central controller 15 using a communication device 18c. Devices 18c can be a feature phone device that is able to communicate using either a wireless, PSTN (Public switched telephone network), ISDN (Integrated services digital network) line, satellite or other such electronic communication channels.

Event host, guests and controller can communicate by sending and receiving a byte stream over the electronic communication channel using Transmission Control Protocol (TCP) and/or User Datagram Protocol (UDP) over Internet Protocol (IP). Such electronic communication channel can consist of a wired connection using a telephone line, Digital Subscriber Line (DSL), Wireless (using 802.11a/b/g or WiMAX etc.), cellular (Code Division Multiple Access 'CDMA' or General Packet Radio Service 'GPRS etc.), or any other such communication channel.

Figure 3:
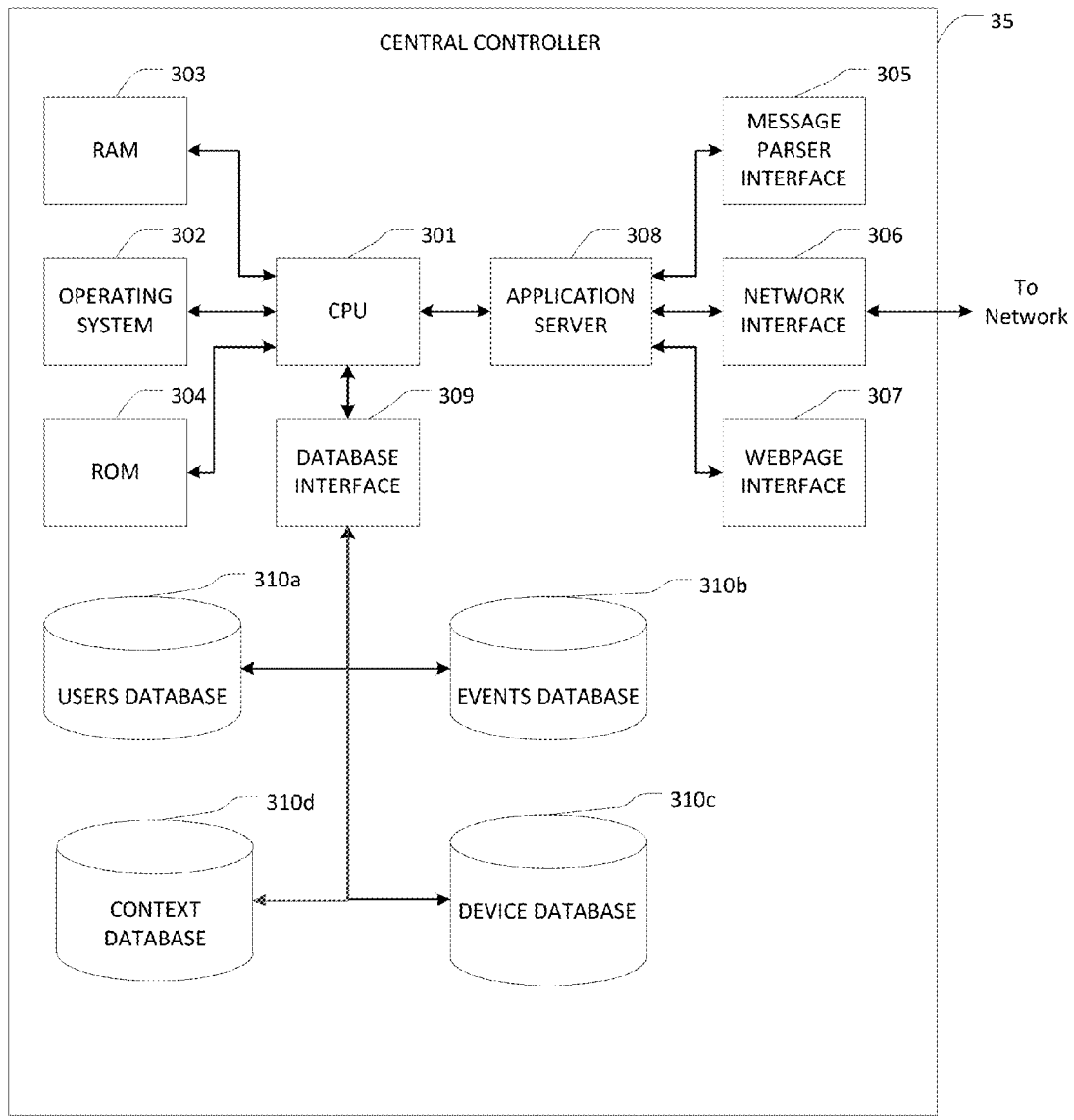
FIG. 3 is a block diagram showing one embodiment of the central controller.

A typical central controller 15 in FIG. 1, can be a high-speed computer containing a central processing unit ("CPU") 301, operating system 302, RAM 303, ROM 304, application server 308, and database interface 309 as shown in FIG. 3. CPU 301 may be a 3.2 GHz Intel Core i7 microprocessor manufactured by Intel Inc. Application server 308 can be a Java Application Server using Java Platform, Enterprise Edition or .NET Server developed by Microsoft. Application server runs a customized software application for processing and handling of bid offer requests, responses and transaction messages in the present invention using a software-based message interface 305, network interface 306 and webpage interface 307.

Database interface 309 may use Database Management System (DBMS) manufactured by Teradata or Oracle Corp. to access the database storage 310a to 310c. Data storage devices 310a to 310c contain databases used in the processing of bid offer requests, responses and transaction messages in the present invention.

Figure 7:
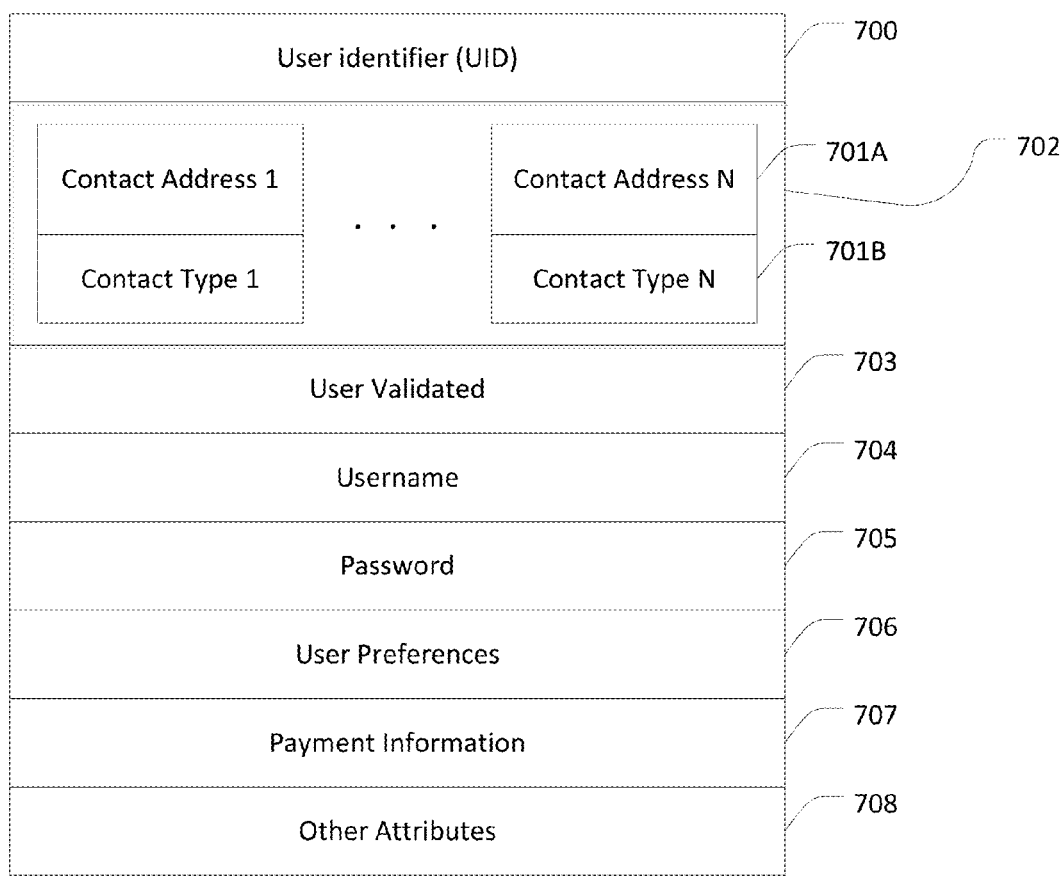
FIG. 7 is an illustration of the relevant fields of a user record maintained for each user in the database in the memory storage in one embodiment of the central controller

User database 310a contains data attributes for user accounts described in FIG. 7. Preferred embodiment of the current invention contains data attributes, for example, a unique identifier 700 for each user; Field 701A is the contact address for the user describing the electronic contact information details associated with the field 701B, contact type for the user describing the type of contact user has registered with the system for example email address, phone number etc.; contact information, field 702, describing contact information may contain multiple records for fields 701A and 701B as shown in the FIG. 7 for the actual values where the user can be contacted electronically depending on the respective contact type and contact address; Field 703 is a flag indicating whether the user's contact information has been validated using a means that is dependent on the contact type; Fields 704 contains a unique username for the user within the system and field 705 contains a password that is private to the user and is provided by the user at the time of establishing a connection with central controller for validating the user's identity. Field 706 allows user to specify and store preferences, for example, preferred contact type, preferred mobile device if user registers from multiple devices, local time zone et cetera in the system. Field 707 contains information for receiving and sending payments and other financial transactions for the user et cetera. Each user account record in the database can have multiple fields 701 to 702 depending on how many contact types and contact information values a user wants to register with the system. Field 708 may contain data for other user attributes, for example, user location, date of birth, gender and/or any information related to frequent contact list, social circles et cetera.

Figure 8:
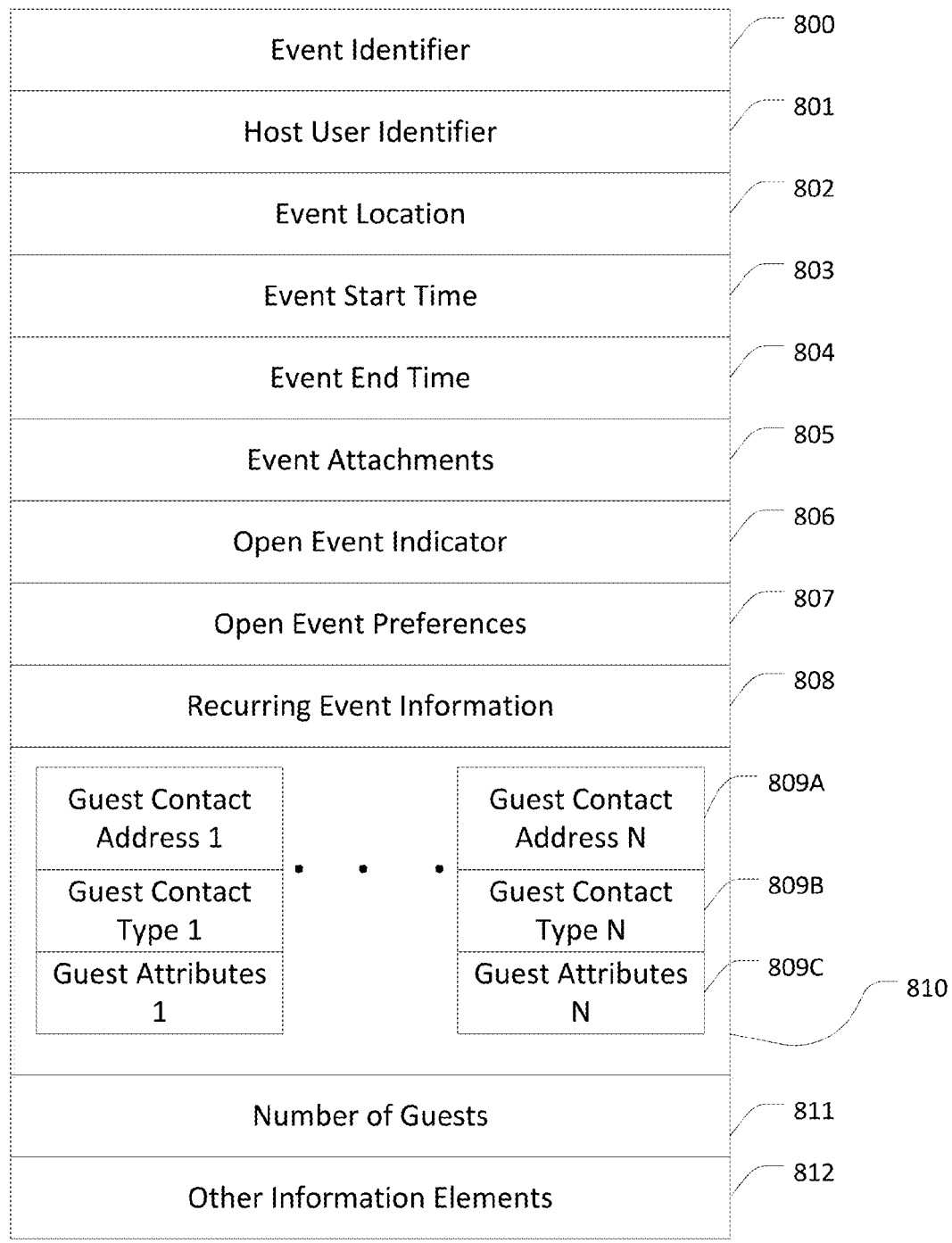
FIG. 8 is an illustration of the relevant fields of an event record maintained for each calendar event in the database in the memory storage in one embodiment of the central controller
Figure 9:
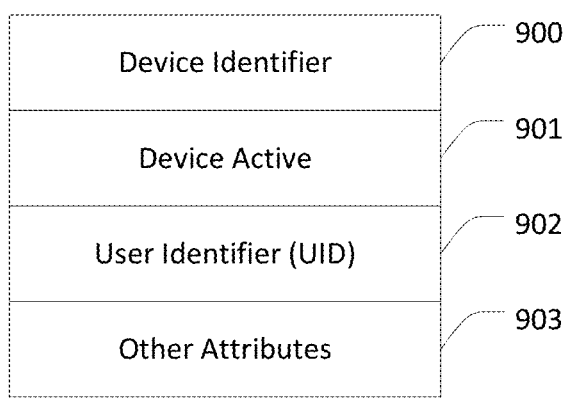
FIG. 9 is an illustration of the relevant fields of a mobile device record maintained for each mobile electronic device in the database in the memory storage in one embodiment of the central controller

Events database 310b contains data attributes for event records such as event title, location, start time, end time, message attachments, guest list etc. FIG. 8 shows, by the way of an example only, few such data attributes related to an event record in one embodiment of the present invention. As shown in FIG. 8, field 800 is a unique identifier assigned to each event by the central controller 15. Other fields as shown in FIG. 8 are: Field 801 is the user identifier for the event host as derived from the user account fields of the event host information at central controller 15; Field 802 provides location of the event containing latitude and longitude information along with the text address of the event location; Field 803 is the start time and date of the event; Field 804 is the end time and date of the event; Field 805 contains any attachment data related to the event; Field 806 is a flag that indicates whether the event is created as "open" event for guests to join later; Field 807 contains preferences related to the creation of open event, such, for example, permission for search ability for the event within the system, permission for guests to join the event anonymously without sharing contact information, which information fields are visible to a user without joining the event first, are guests allowed to see and share each other's contact information, are event guests allowed to send instant messages to each other; are event guests allowed to join the event without getting approval from the event host first et cetera. Field 808 contains information about recurring events including the frequency, number of occurrences etc. Field 809A contains contact address of each guest, field 809B contains the contact type of the contact address and field 809C contains information about the attributes for the guest, for example, permission for guest to join the event anonymously without sharing contact information, which information fields are visible to the guest, if guest is allowed to see and share other guests' contact information, if guest is allowed to modify location of the event; if guest is allowed to modify the time of the event et cetera. Each event record can have multiple entries for the fields 809A, 809B and 809C as denoted by field 810; Field 811 denotes the total number of guests for the event. Field 812 contains information about other information elements related to the event, for example, information about the event entry price if any, event website, messages, instant messages et cetera. There may be many such information fields related to a calendar event and the list here presents a set for one embodiment.

Device database 310c contains attributes for all mobile electronic devices connected to the system through the client application. In one embodiment, such attributes of device include field 900 that contains a unique device identifier for each mobile electronic device. Device identifier can be any of such data as provided by the device manufacturer application interfaces (APIs), IMEI, MAC address, SIM card number et cetera. Field 901 shows if the device is active, that is if the user has logged into the system using the device. Field 902 contains the user identifier that is derived from the user account information field 700 in FIG. 7. Field 903 contains other data attributes specific to the mobile electronic device such as, but not limited to device IP (Internet Protocol) address, network carrier, time of last login et cetera.

Context database 310d contains attributes related to a specific context established for exchange and synchronization of data among two or more users. Such context, for example may be created when a user sends a picture or video to one or more other system users. Still another context may be created when a user sends an invitation to other system users for a calendar event. The context is created when a system user sends a request message to establish a context for sharing information with other system users. And the context exists until the same user either indicates to the central controller to delete the context or such context automatically expires if it was initially created with a time limit as either provided by the sending user or as determined by the system automatically. Each context is identified by a unique context identifier.

A person familiar with the art may easily identify additional such fields for user, event and device record. Thus the purpose of this description is to provide an example of such set without being limited to the information elements described for each record and still another implementation of the current invention may include many other such information elements for each record type.

While the present embodiment describes the central controller 15 as a single computer, those skilled in the art will realize that the functionality can be distributed over a plurality of computers. As such some application server software components can reside within the user 17a or devices 12, 17b et cetera.

Figure 2:
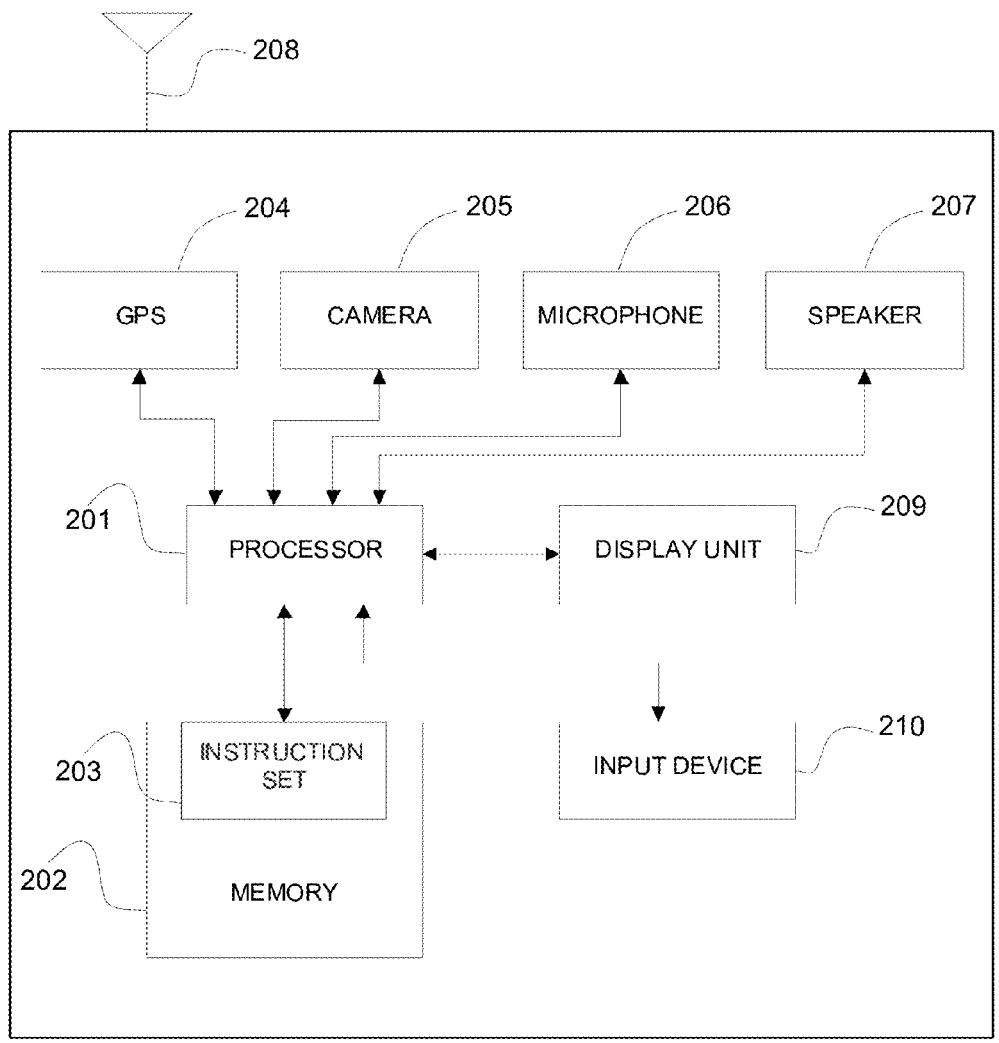
FIG. 2 shows a block diagram of one embodiment of the client mobile electronic device of the user.

FIG. 2 shows the components of a typical mobile electronic device having a processor 201 and memory 202 to store programs and data. Client application on the mobile electronic maintains a local database in the memory 202 and provides an instruction set 203. Processor 201 operating with instruction set 203 interacts with other components of the device including the GPS system 204 to collect location coordinates of the mobile electronic device. Client application also provides instructions to the processor 201 using instruction set 203 to record a picture and/or video using camera device 205, record the voice using microphone device 206, play the audio and notification tones using speaker 207, control the display provided to the user using display unit 209, collect user inputs using input device 210 and send and receive data using the networking interface 208. Display 209 can be an OLED, LED type of display that also has a touch sensor to recognize user inputs as input device 210. Networking interface 208 can use radio network (GSM, GPRS, CDMA, LTE etc.), wireless network (802.11 a/b/g/n etc.), Bluetooth or any other communication protocol to establish an electronic network connection for sending and receiving digital data stream.

Figure 4:
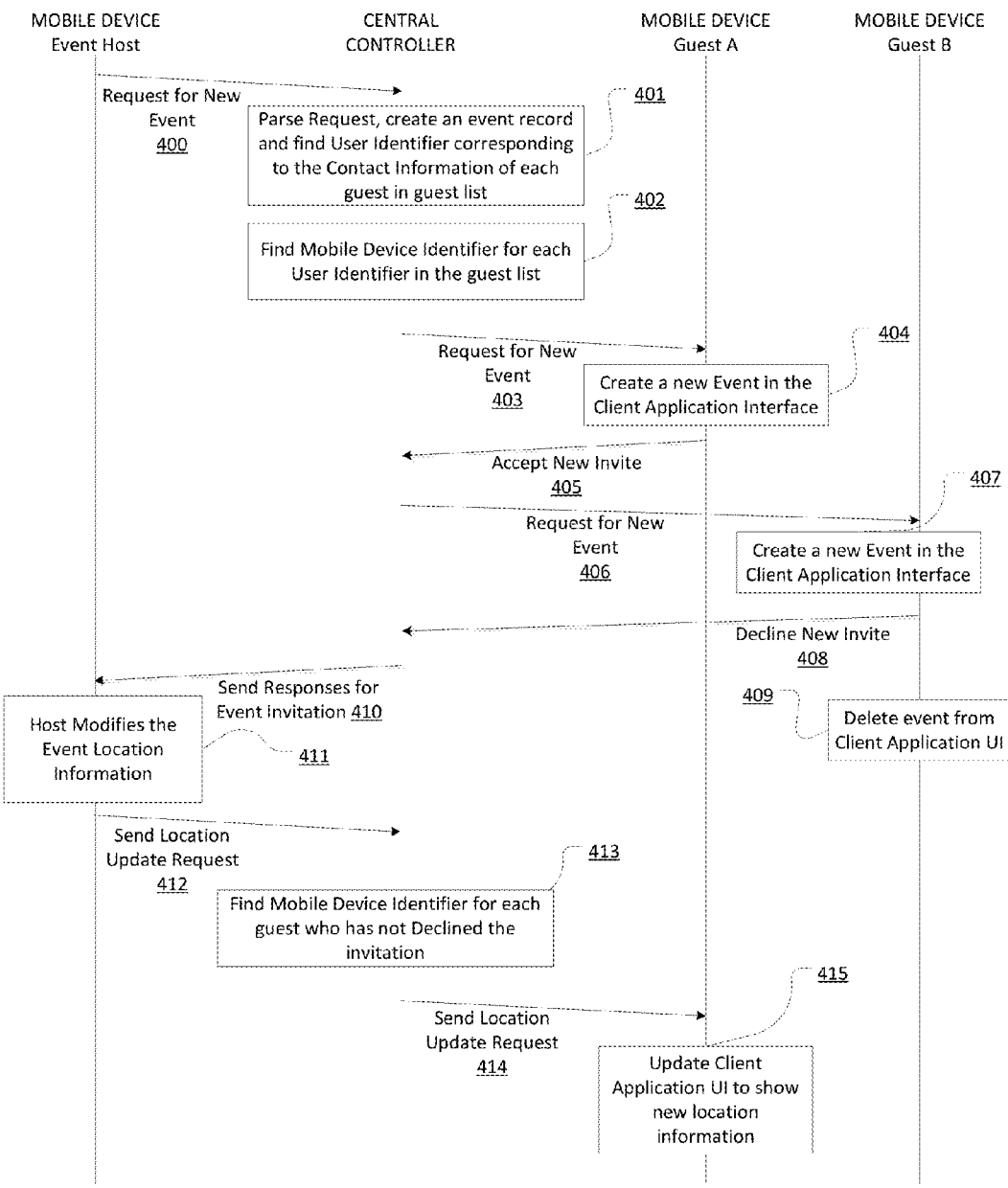
FIG. 4 shows request and response messages in a timing sequence initiated by a host's request to create a new event in one embodiment.

FIG. 4 with continued reference to FIG. 1 shows the sequence of messages and events that take place among the event host, central controller and guest(s) in one embodiment. First, the event host 10 sends a request message 400 to the central controller to create a new event.

Figure 14:
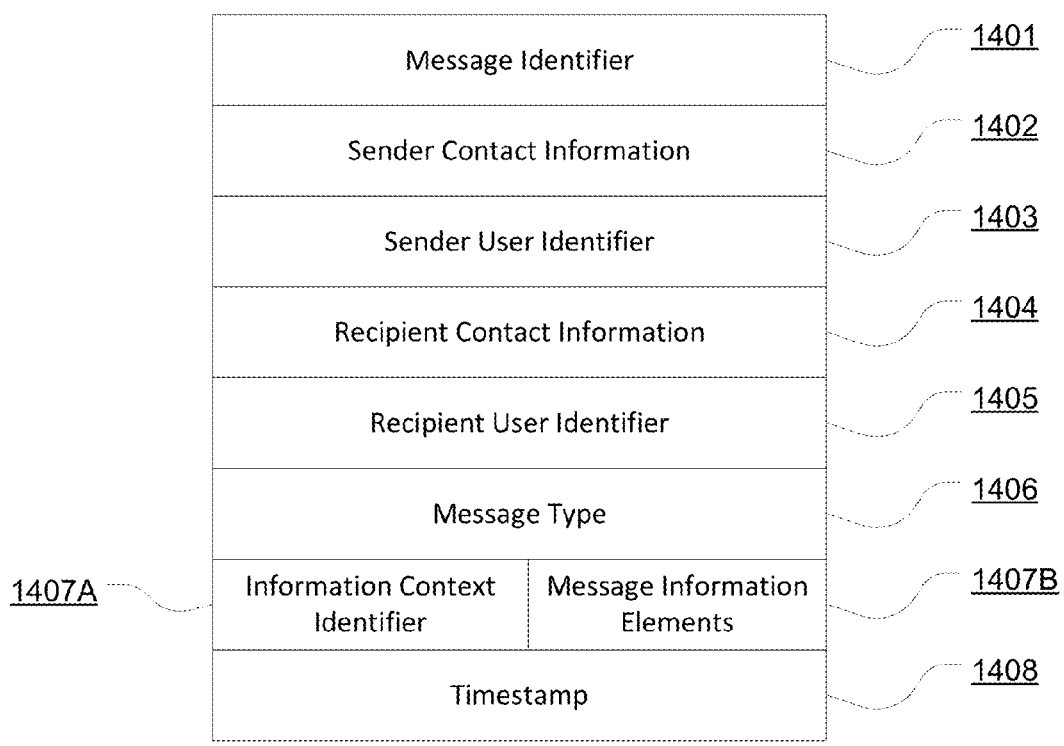
FIG. 14 shows one embodiment of the message structure for the request and response messages exchanged between the central controller and the client application at the mobile electronic device for establishing a direct communication link between the users and for synchronizing the event information for a calendar event

Message between the central controller and client application are exchanged in a byte stream that is sent over the communication network. FIG. 14 describes the structure and format of the messages exchanged between central controller and client application in preferred embodiment. In one embodiment, each message contains the following information elements: A message identifier, 1400, is a number that is auto incremented every time a message is sent or received by the client application or central controller; Information elements 1402 and 1403 contain the contact information of the sender and the associated user identifier as determined by the central controller respectively. Information elements 1404 and 1405 contain the contact information of the receiver and the associated user identifier as determined by the central controller respectively. Information element 1406 denotes the type of the message, for example, "Create" to create a new event, "Update" to update an existing event, "Delete" to delete an existing event, "IM" to send an instant message related to an event et cetera; Information element 1407 contains the information context identifier 1407A and a detailed information field 1407B for each message type, for example, the message information for "Create Event" message type contains all the event field information as shown in FIG. 8. If message is related to an event then the event identifier is also contained within information element 1407B. Finally, information element 1408 is the timestamp containing date and time information of the instant when message was received by the central controller.

Further continuing with FIG. 4, in step 401, Central controller parses the request message and creates an event record in the events database using the information received in the message and extracts the guest list from one of the information elements contained in the request message. Central controller also creates a webpage for the event information display and a link to the webpage for each guest associated with the event identifier for the event record. In step 402, central controller access the user database 310a from FIG. 3 to find the user identifier associated with the contact information of each guest in the guest list. Central controller uses this user identifier to query the device database 310c from FIG. 3 to find the mobile devices associated with each user identifier. Central controller then sends a notification message containing the event identifier of the new event to the client application on each mobile device as shown in messages 403 and 406 shown in FIG. 4. Though not shown in the FIG. 4, central controller also sends a message containing the webpage link for the event through a conventional mechanism associated with each contact type for the guests. The conventional method is automatically determined by the central controller and client application based on the user preferences as stored by the system and contact information for the user as provided in the event invite. Such conventional method for message delivery may use email message for guests with email contact type, SMS (Short Messaging Service) for guests with phone number contact type and an email message for guests with both email and phone number information but who prefer to receive email message as indicated in the preferences associated with their respective user record in the user database et cetera. Client application at the mobile electronic device of Guest A receives message 403 and invokes a procedure to establish a secure HTTP connection with the central controller for receiving further data for the fields related to the calendar event. Client application at the mobile electronic device of Guest A then populates the relevant fields related to the event and displays the event information on the device screen in step 404.

Figure 6:
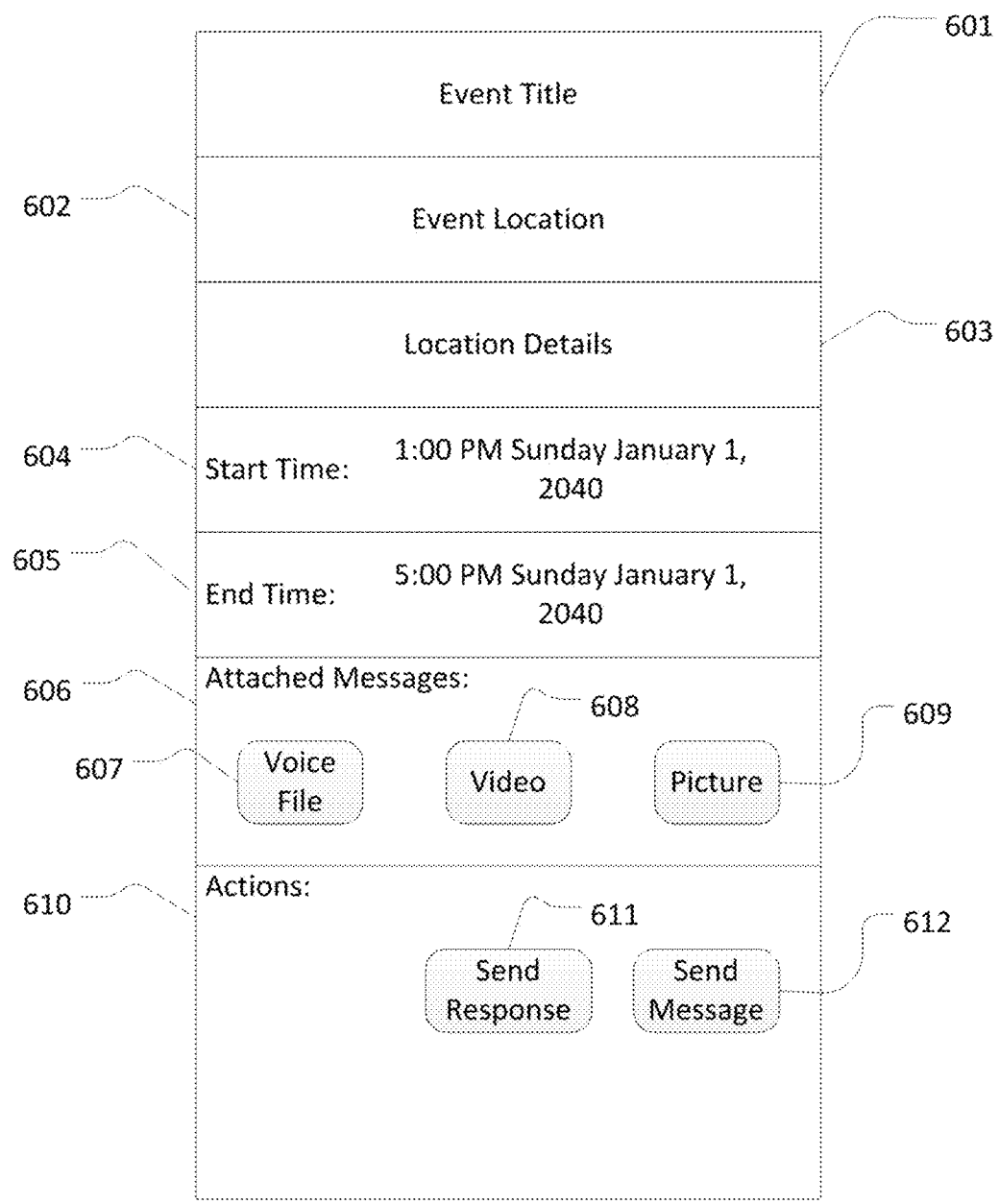
FIG. 6 is an illustration of one embodiment of the user interface that is displayed for viewing the invitation for a calendar event at the client mobile electronic device of the user who is an invitee for the calendar event

FIG. 6 shows, as an example of one embodiment, one such user interface to display event information on the mobile electronic device of the guest. Field 601 is the title of the event or the subject of the event; field 602 is the address of the location of the event; field 603 contains any other information about the location, for example, landmarks, suite number inside a building et cetera; fields 604 and 605 show the start time and end time respectively for the event; field 606 is an area within the display where any other data attached to the event is displayed, for example, field 607 as an active button if there is any voice message attached to the event, field 608 as an active button if there is any video message attached to the event, field 609 as an active button if there is any picture attached to the event et cetera. These buttons are displayed as an area on the screen where the user can provide an input by simply selecting, touching or clicking within the area.

Client application controls the type of the button to display in the area 606 and also if the buttons should be in enabled state or disabled state based on the guest permissions information elements contained within the event information received from central controller for a given event identifier. Central controller can send additional messages to the client application to update, to add and/or to remove these information elements at a later time. A disabled button does not respond to user input of touch or click. An enabled buttons responds to the user input of touch or click by invoking a further process in the client application. For example, if the Video button 608 is enabled then when the user touches the button area on the mobile device display such further processing may involve the steps: Client application sending a request to central controller to provide the information of the latest video file; Client application determining if the latest video file is already available in the local database for the event; If the video file was already downloaded from central controller then play the video on device screen display; If the video was not already downloaded then send a request to central controller to provide the latest video file and establish a secure HTTP connection with central controller to receive the video file data. Area 610 in FIG. 6 shows available action buttons for the user such as, button 611 to send a response to the event host, button 612 to send an instant message to other participants of the event et cetera. FIG. 6 is just an example of the interface displayed by client application to represent event information to the guest user and actual interface may include many other fields and buttons that allow user to interact with the client application and invoke various further procedures.

Going back to FIG. 4, Guest A sees the event information and accepts the event invitation. Client application sends the message 405 to central controller wherein message contains the event identifier and the acceptance indicator from Guest A. At this time, client application also creates a new event entry in the default calendar application of the mobile device by populating the relevant information fields from the event information from client application.

Client application at the mobile electronic device of Guest B then populates the relevant fields related to the event and displays the event information on the device screen in step 407. Guest B sees the event information and declines the event invitation. Client application sends the message 408 to central controller wherein message contains the event identifier and the decline indicator from Guest B. At this time, client application updates the display of the mobile electronic device and deletes the event from the local database and display in step 409.

Figure 19:
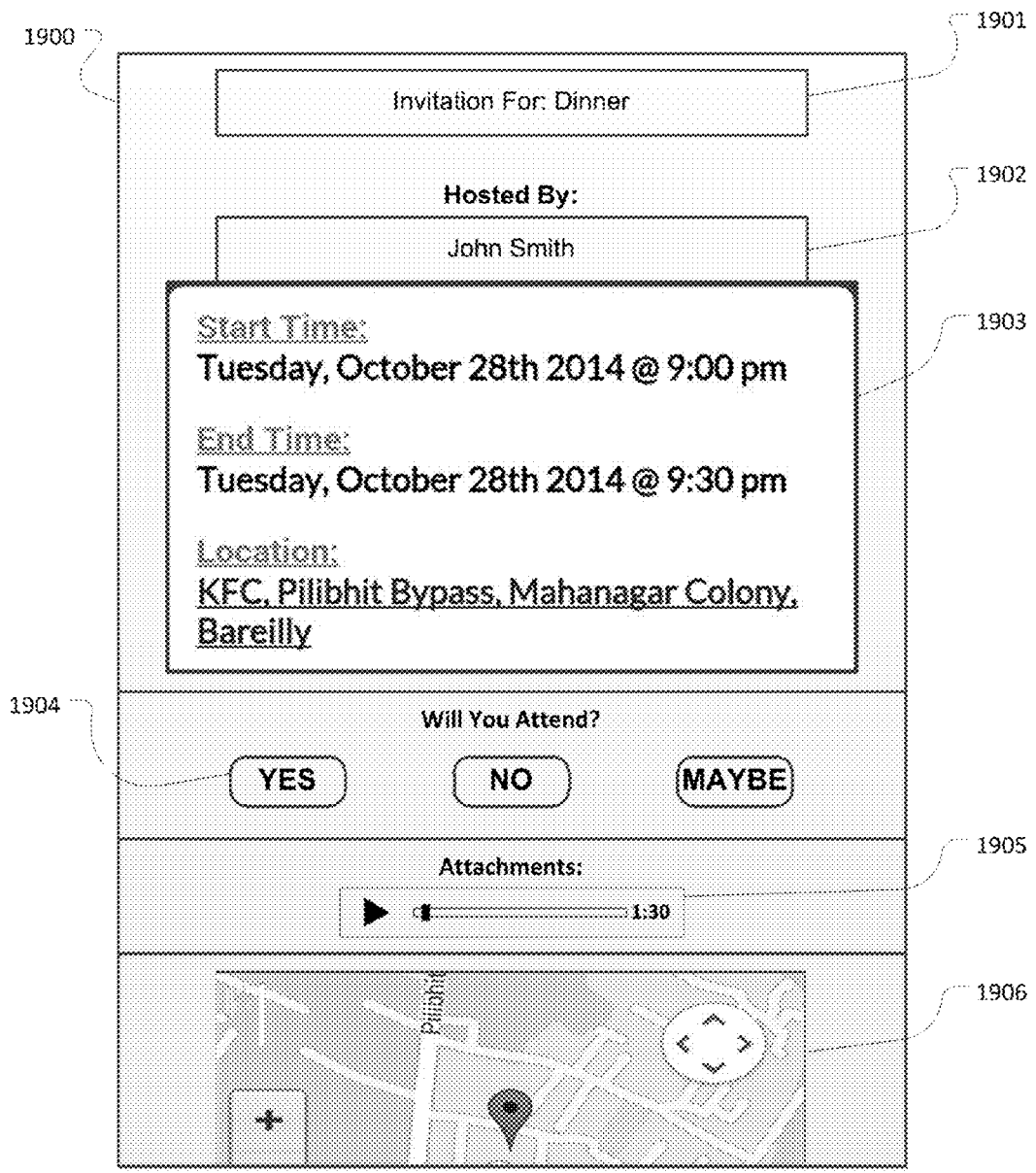
FIG. 19 shows an example of the webpage interface in one embodiment of central controller to display the event information in a web browser without invoking the client application on the users' mobile device

Guest C who does not have the client application but receives the message containing a webpage link for the calendar event can enter the information in a web browser and access the event information using the web interface of the central controller. Central controller provides a webpage interface in one embodiment as shown in FIG. 19 to display the event information in a typical web browser, for example, Internet Explorer, Firefox, Chrome et cetera. Central controller uses secure HTTP connection to communicate with the web browser to display the event information and capture user inputs.

Central controller updates the event record in the event database to store the latest responses from the event guests and also sends the message 410 to the client application at the host mobile device to inform about the responses received so far from the guests. If at a later time, event host changes the location of the event as shown in step 411 then client application at host device sends a request 412 to the central controller for location update. In step 413, central controller updates the location information of the event in the event database and determines the guests who have not sent a "decline" response for the event and the mobile devices associated with those guests as determined from the device database. Central controller sends a message 414 to the client application on those mobile devices. Upon receiving the update message, client application invokes a process to update the event information in the local database and update the event location if the event is being displayed on the device screen when the message was received.

Figure 10:
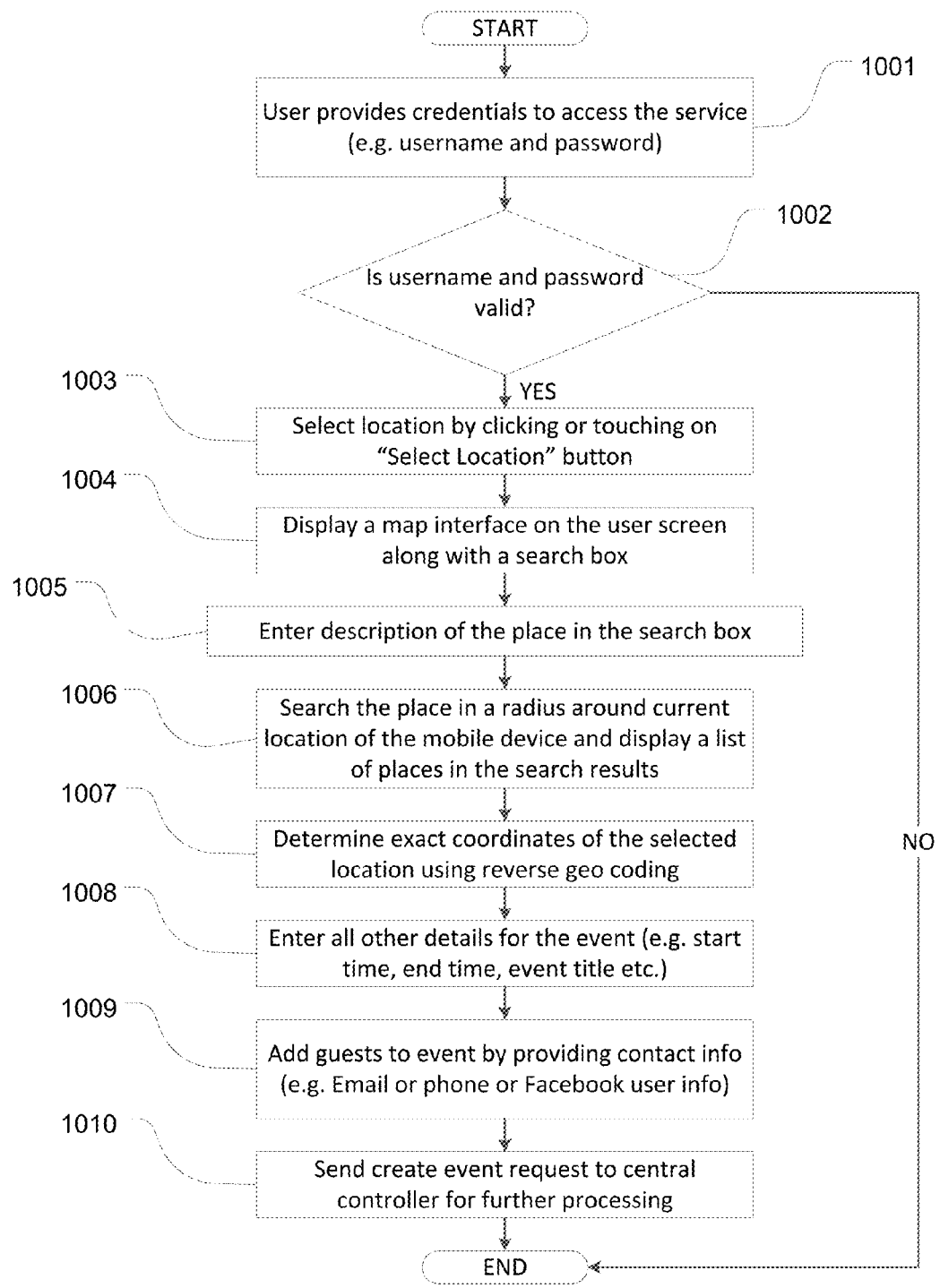
FIG. 10 shows the flow diagram of one embodiment of the action steps taken by the client application at the mobile electronic device of the event host user for creating a new event

FIG. 10 is a flowchart of the steps taken by the host user in one embodiment of the current invention for creating a new calendar event. First, in step 1001 the user provides her credentials to identify herself within the system. Client application sends the provided information to central controller in a secure HTTP connection. In step 1002, central controller validates the credentials and sends a response back to the client application. If the user is not a valid user then client application does not allow the user to create a new event. If the user is a valid user then client application displays an interface on the mobile device as shown in FIG. 5.

Figure 5:
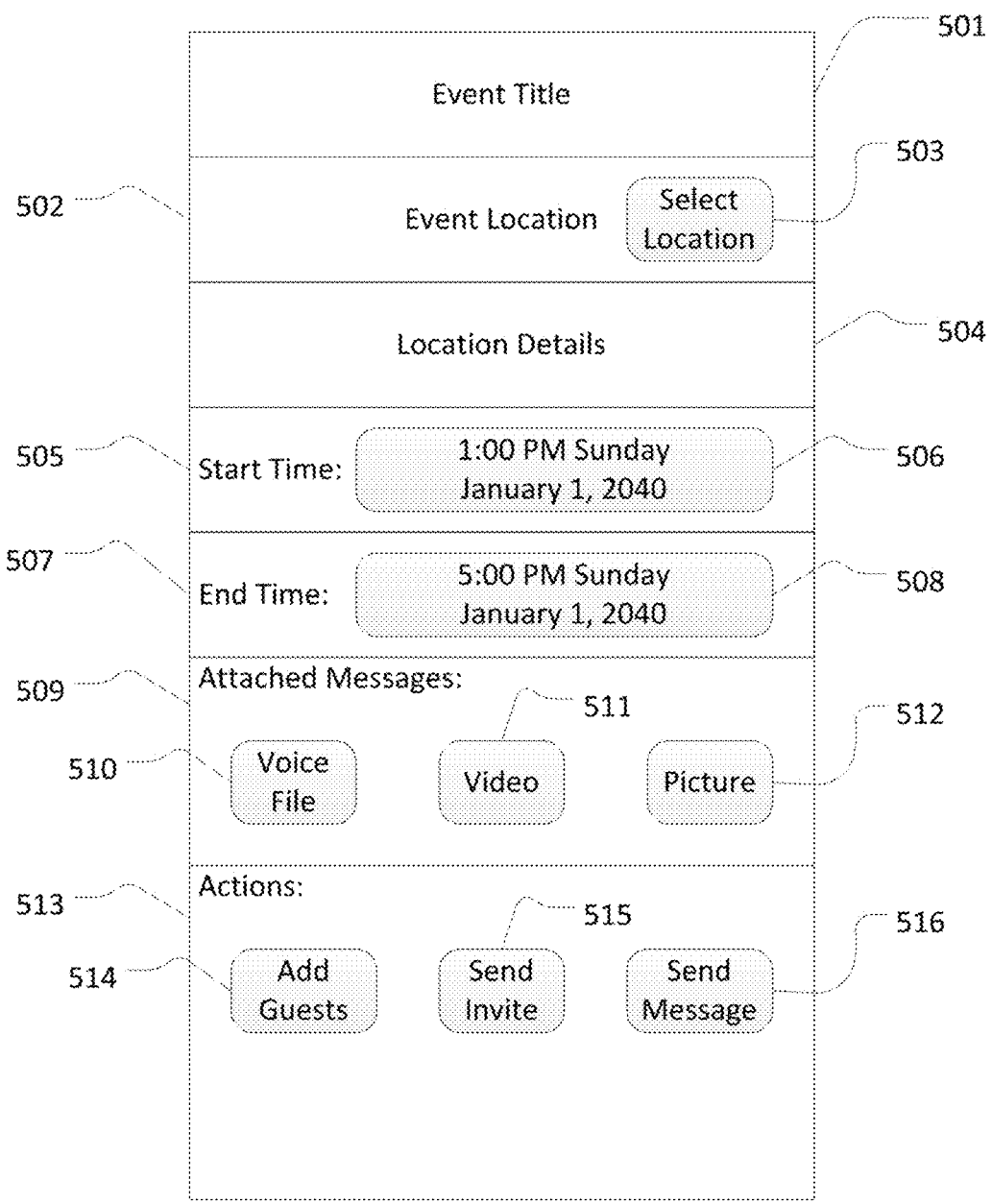
FIG. 5 is an illustration of one embodiment of the user interface that is displayed at the client mobile electronic device of the user who wants to host a meeting

FIG. 5 shows, as an example of one embodiment, one such user interface to create a new event on the mobile electronic device of the event host. Field 501 is an input fields for the title of the event or the subject of the event; field 502 is to input the address of the location of the event; field 503 is a button that the user can select by clicking or touching within the area of the button display to search for place for the event location; field 504 is used to provide any other information about the location, for example, landmarks, suite number inside a building et cetera; fields 505 and 507 show the start time and end time respectively for the event wherein buttons 506 and 508 can be selected to enter the time using a more user-friendly interface for entering the time and date; field 509 is an area within the display where any other data attached to the event is displayed, for example, field 510 allows the host user to attach any voice message attached to the event, field 511 allows the host user to attach any video message attached to the event, field 512 allows the host user to attach any picture to the event et cetera. These buttons are displayed as an area on the screen where the user can provide an input by simply selecting, touching or clicking within the area.

Client application controls what button to display in the area 509 and also if the buttons should be in enabled state or disabled state. A disabled button does not respond to user input of touch or click. An enabled buttons responds to the user input of touch or click by invoking a further process in the client application. For example, if the Video button 511 is enabled then when the user touches the button area on the mobile device display such further processing may involve the steps: Client application enabling the camera and microphone on the device to start capturing a video; Client application allowing user to edit the video before attaching to the event; Client application further processing the video data using any video compression formats, for example, MPEG4, AVI et cetera; If the video was not already sent to the central controller to provide the latest video file then establish a secure HTTP connection with central controller to send the video file data. Area 513 in FIG. 5 shows available action buttons for the user such as, button 514 to add guest to the event invite by providing the contact information of each guest or by adding a pre-existing contact group, button 515 to send the invite to the recipient guests, button 516 to send an instant message to other participants of the event et cetera. FIG. 5 is just an example of the interface displayed by client application to represent event information to the guest user and actual interface may include many other fields and buttons that allow user to interact with the client application and invoke various further procedures. Similarly if the user selects the button 503 to search for a place then client application invokes another process by displaying the map interface on the user screen as shown in FIG. 13.

Figure 13:
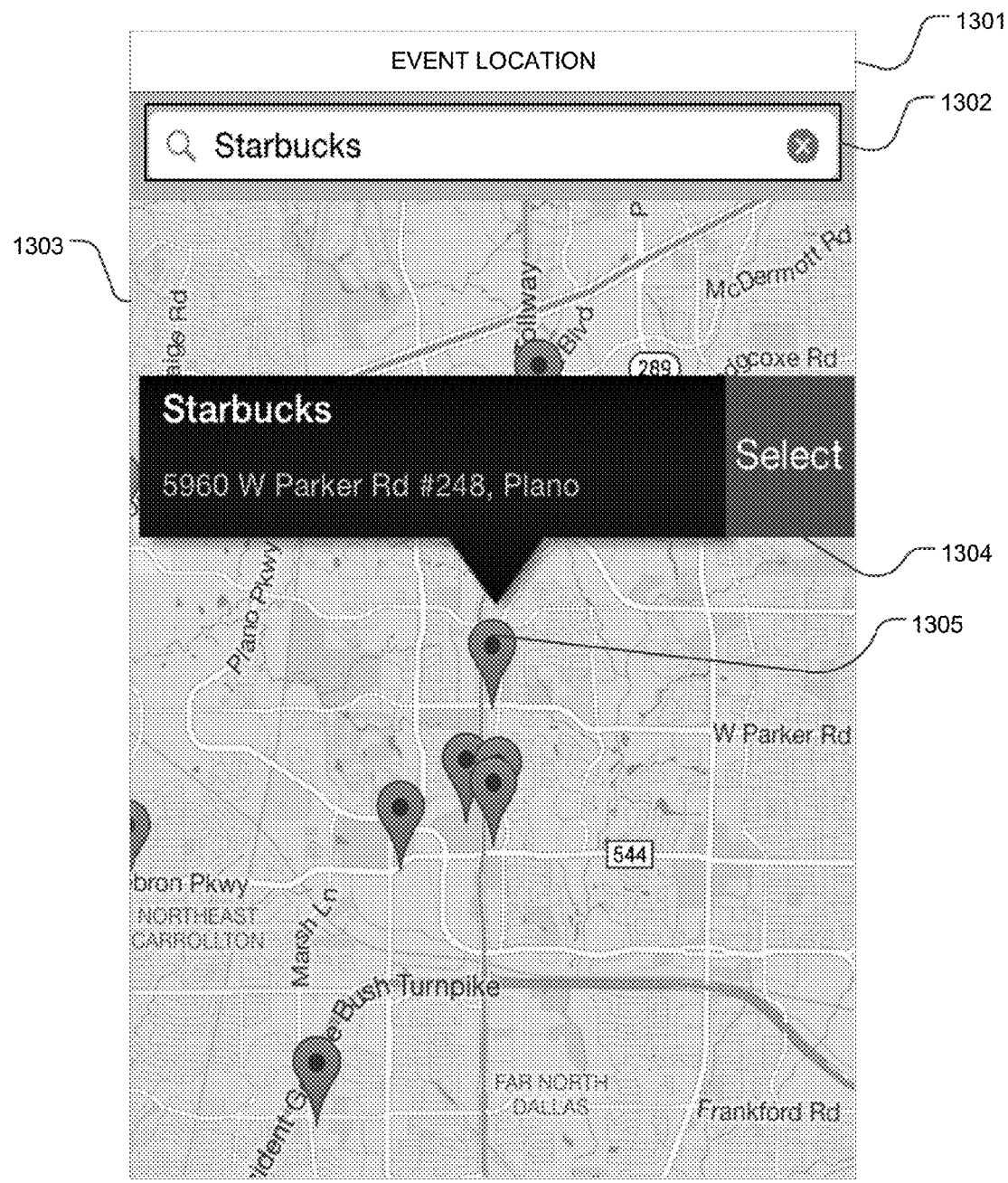
FIG. 13 shows one embodiment of the user interface displayed to search for an event location and determining the address automatically by the client application at the mobile electronic device of the user

FIG. 13 contains a text entry area 1302 where user can enter some identifying information about the place such as "Restaurant", "Italian Restaurant", "Mexican Restaurant", "Coffee shop" et cetera. Client application then interacts with the available GPS and map application on the mobile device to search for such places within a given radius around the current location of the mobile electronic device. Client application then displays the search results on a map along with specific marks 1305 at the given latitude and longitude position of each place. When the user selects one of the marks then client application displays more detailed information about the place as shown in field 1304. Such detailed information may include address of the place, name of the place and again a button to select that place as the location of the event.

Continuing further with the flowchart of FIG. 10, in steps 1003 to 1009, user provides relevant information for the event in a more intuitive manner as described above in reference to FIGS. 5 and 13. In step 1010 of FIG. 10, client application at the mobile electronic device of the host, packages all the information for the event as provided by the user into a message and sends it to the central controller using secure HTTP connection.

Figure 11:
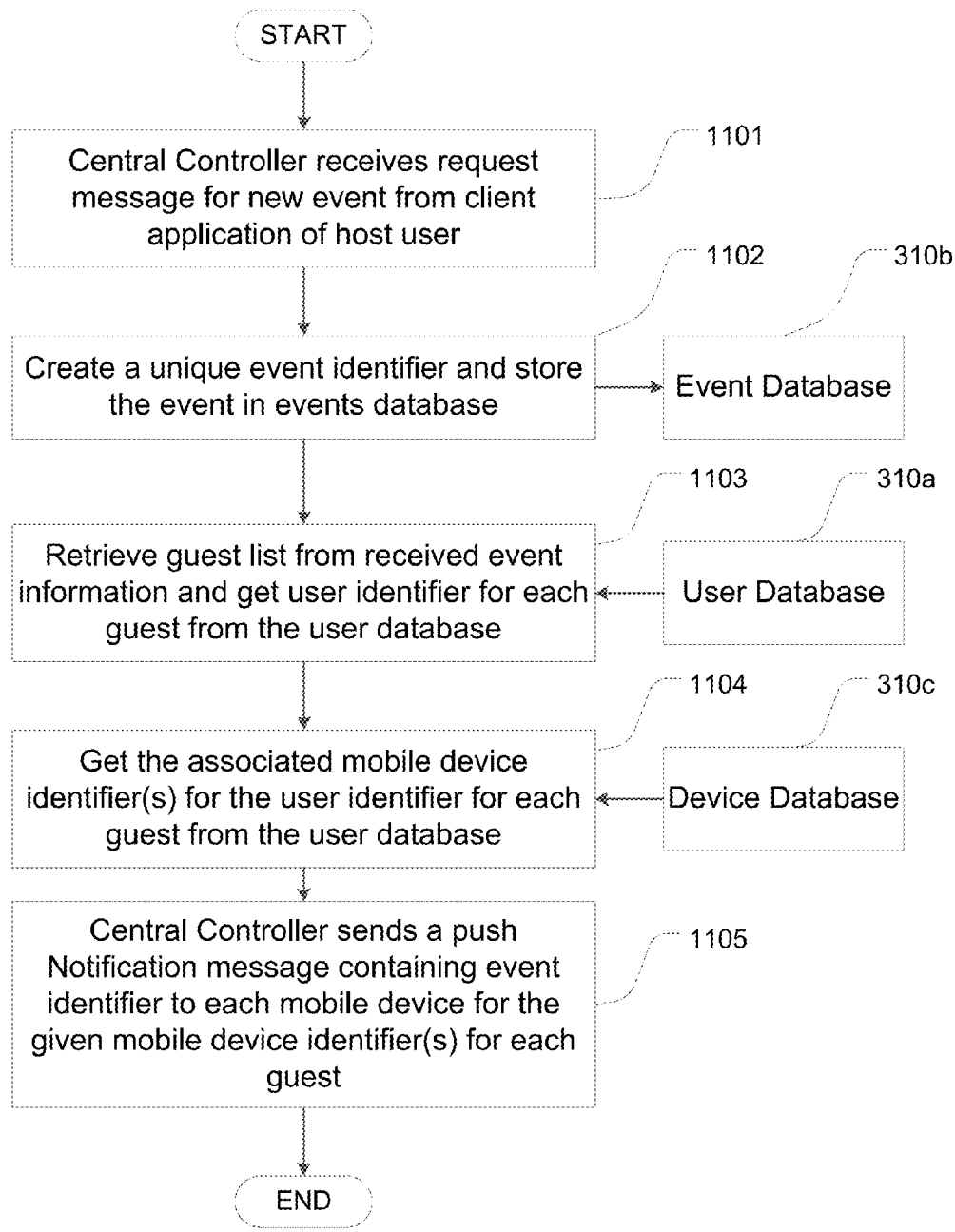
FIG. 11 shows the flow diagram of one embodiment of the action steps taken by the central controller for processing a new event request received from the event host user

FIG. 11 shows the flowchart for actions taken by the central controller in one embodiment of the current invention when central controller receives the request for new event from the client application of the event host as shown in step 1101. In step 1102, central controller generates a new event identifier using a method that guarantees uniqueness of the event id within the system and the host mobile device of the client application by using a globally unique identifier (GUID). One such method, for example, is the OSF-specified algorithm for generating new (V1) GUIDs where the user's network card MAC address is used as a base for the last group of GUID digits, which means, for example, that the calendar event can be tracked back to the computer that created it. The other parts of a V1 GUID make use of the time since the implementation of the Gregorian calendar in 1582. V1 GUIDs, containing a MAC address and time, can be identified by the digit "1" in the first position of the third group of digits, for example {2F1E4FC0-81FD-11DA-9156-00036A0F876A}. Version 1 GUIDs generated between about 1995 and 2010 have Data3 starting with 11D, while more recent ones have 11E. Central controller may also create a graphical representation of the event identifier such as a linear barcode (for example Code 39, Code 93 etc.), matrix barcode (for example QR Code, Aztec Code) et cetera. This allows users to simply scan the event identifier encoded in the graphical representation and get the information for the calendar event related to that event identifier. The graphical event identifier generated by central controller can be displayed by the client application of the host on the mobile device. It can also be printed on a conventional medium, for example, paper, posters, billboards et cetera.

In step 1102 of FIG. 11, central controller stores the event information associated with the created event identifier into the event database 310b. Central controller, in step 1103 retrieves the list of guest contact information includes in the event information and matches the contact information with the user accounts in the user database 310a. Central controller, in step 1104, finds the mobile device identifier of the devices associated with the user account found in the previous step. In step 1105, central controller sends a notification message, as a push notification message, to the mobile devices associated with corresponding mobile device identifiers. Such notification message includes the event identifier for the new event that client application at the receiving mobile device can later use in further communication with the central controller using request and response messages.

Figure 12:
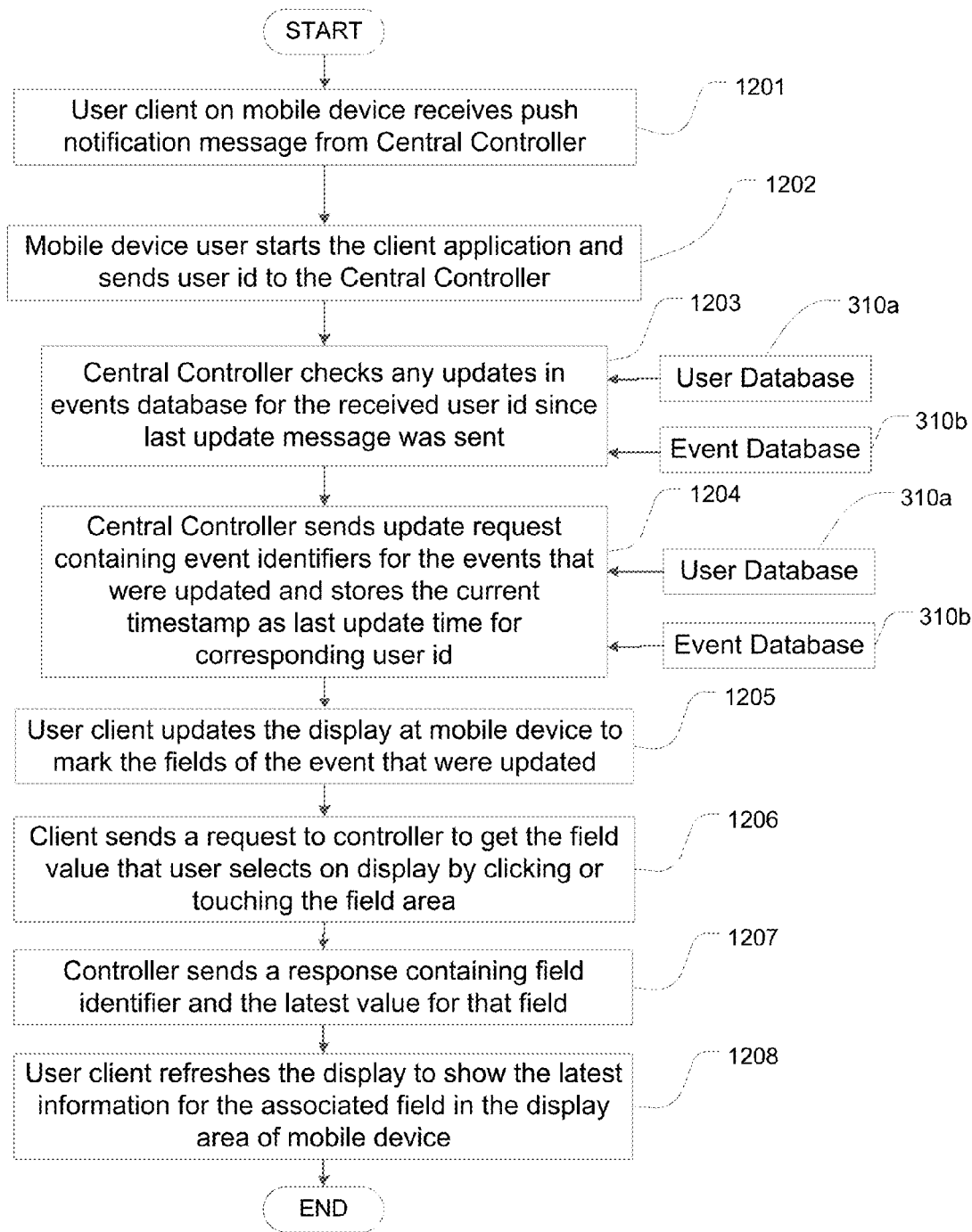
FIG. 12 shows the flow diagram of one embodiment of the action steps taken by the invitee user and central controller for displaying the calendar event information on the mobile electronic device of the invitee user

FIG. 12 describes the flowchart for the actions taken by the client application of the receiving guest mobile device in one embodiment of the current invention. After receiving the push notification message from the central controller as shown in step 1201, mobile device user starts the client application in step 1202. When client application is started, it sends a message to the central controller containing the user identifier along with other information elements. In step 1203, central controller validates the user identifier and the mobile device identifier using user database 310a and checks if any new events or updates for the existing events exists in event database 310b for the given user identifier. Central controller then establishes a secure HTTP connection with the client application and sends messages containing any new information or updated information fields for existing events and marks the current date and time as the timestamp for the last update for the given user identifier in the user database 310*a* as shown in step 1204. Still another mechanism for users to get the event information is to scan the barcode of a graphically encoded event identifier by taking a picture or just capturing in the live view from the camera of the mobile device. Client application at the mobile device will then decode the barcode and communicate with the central controller to get more information for the calendar event associated with the decoded event identifier.

Figure 18:
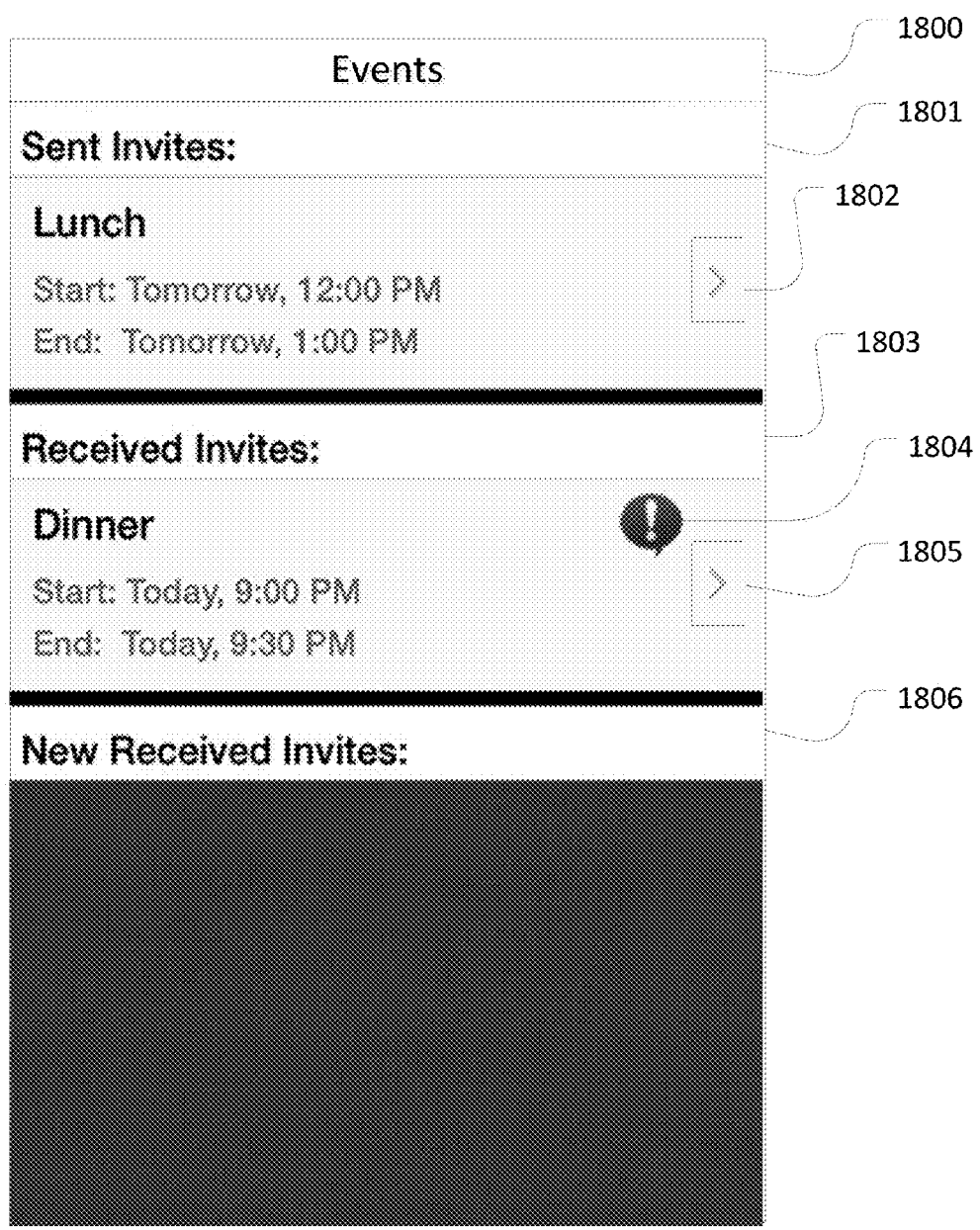
FIG. 18 is an example of the user interface in one embodiment of client application to display calendar event invitations sent and received by a user

In step 1205, the client application at the mobile device of the guest user receives the messages from central controller and invokes the procedure to update the mobile device display to show the latest event information to the user. When a user selects the area that has been marked as updated on the display as shown in FIG. 18 by either clicking or touching within the area, in step 1206 client application send a message to central controller to send the details of the updated information. In step 1207, central controller sends a response message containing the latest value for the given field to the client application. In step 1208, user client application again refreshes the display to show the latest value for the given field within the information displayed on the screen of the mobile device.

Figure 15:
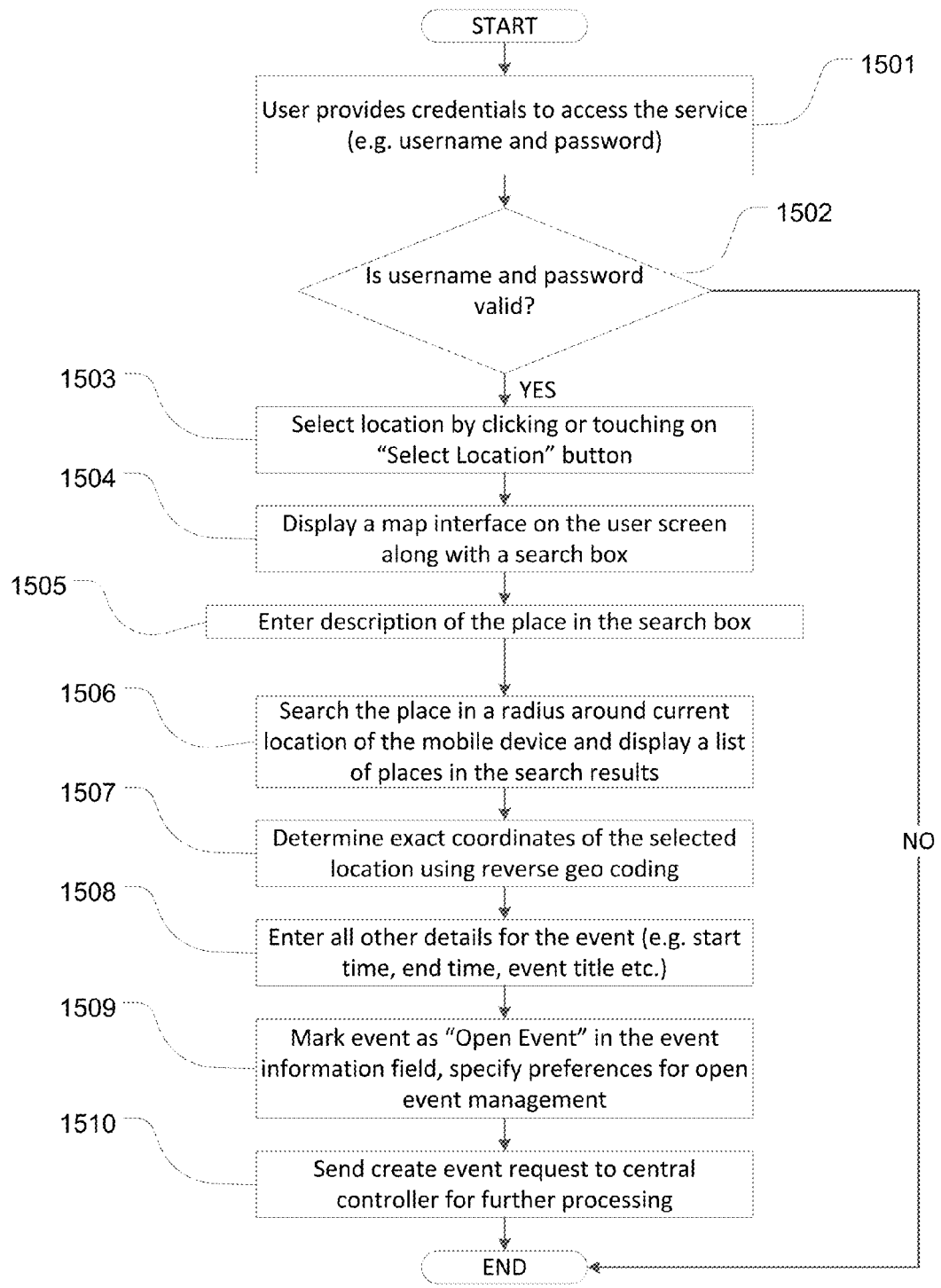
FIG. 15 shows the flow diagram of one embodiment of the action steps taken by the host user for creating an "open event" that is a calendar event that other users can join without first receiving the invite message for the calendar event

FIG. 15 shows an example of the flowchart of steps in one embodiment of current invention to create an "Open Event" where guests can join the event without first receiving an invite for the calendar event. As shown in step 1501, a user that is allowed to create open events logs into the system by providing credentials for the user such as a username and password. Client application sends this information is a message to the central controller and central controller validates the information in step 1502. In steps 1503 through 1507, host user provides the details of the location of the event similar to the methods described in the steps 1003 through 1007 of FIG. 10 earlier.

In step 1508 of FIG. 15, user provides other details for the event such as start time and date, end time and date, title of the event etc. In Step 1509, host user selects the option to create the new event as an "Open Event" and specifies preferences for handling the interaction with central controller and other users of the system for the purpose of event management. Such preferences may include, for example, preference for search keywords that allow central controller to display the event in the results for a search string, preferences for other users to join the event by either first requesting a permission from the host or to join directly, preference for what information element for the event are displayed to other users prior to joining the event et cetera. Finally, in step 1510 client application sends all the event data in a request message to the central controller.

Figure 16:
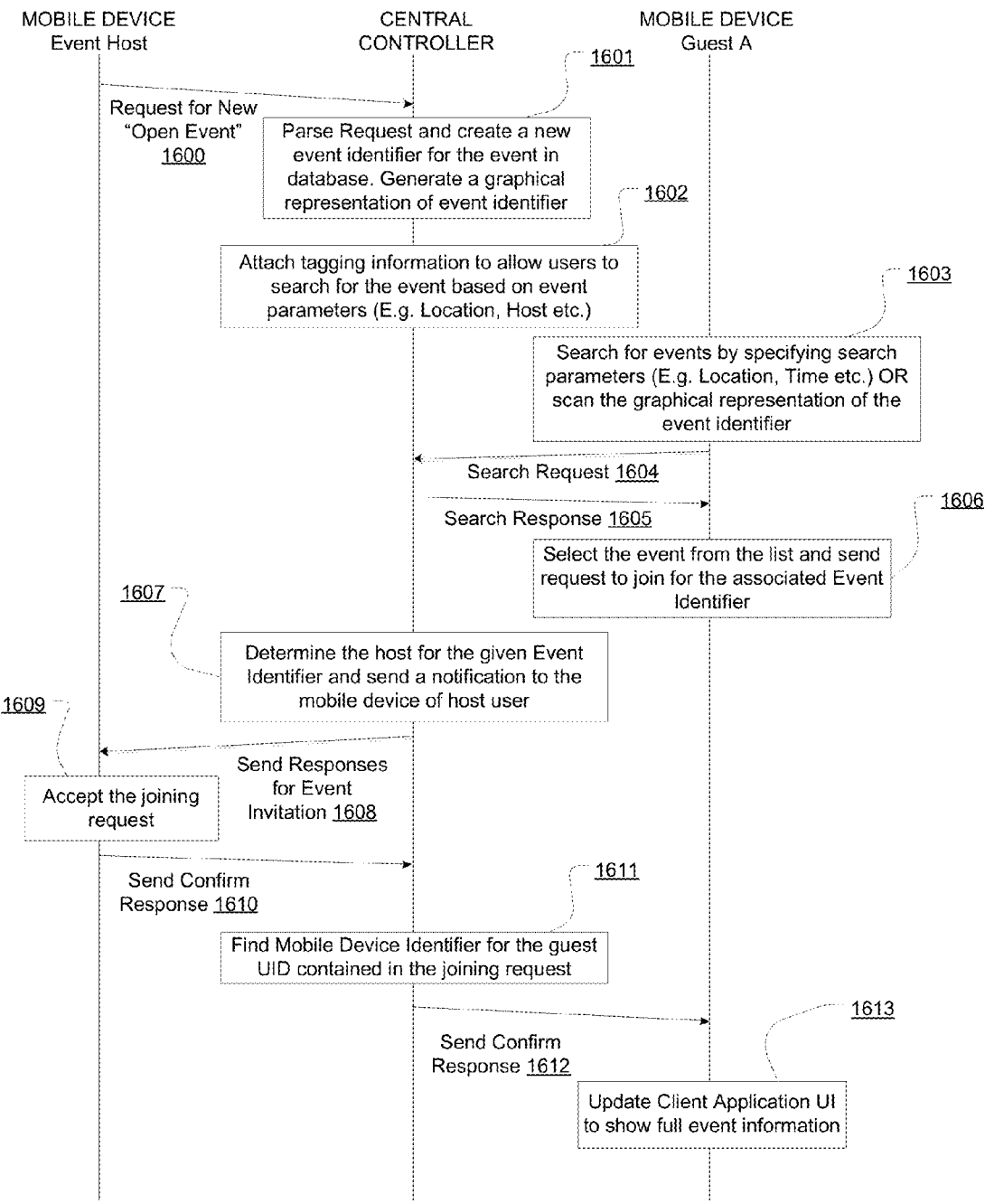
FIG. 16 shows request and response messages in a timing sequence and action steps taken in one embodiment by the client applications and central controller to manage an open event.

In one embodiment, FIG. 16 shows the flowchart for relative timing of messages exchanged between central controller and client application of various users as well as actions taken by each device in relation to an "Open" calendar event. First, event host sends a request message 1600 to the central controller for creating a new open event. In step 1601, central controller parses the request and creates a new globally unique identifier for the event as described earlier in relation to FIG. 11. In step 1602 of FIG. 16, central controller appends the tagging information for the search keywords in the event record based on the parameters of the event received in the initial request message 1600.

Guest A in the system, searches for events by inputting a search string containing certain keyword and parameters in step 1603 at the client application. Such parameters may include, but are not limited to, location of the event, radius around current location of mobile device of Guest A, time of the event, host of the event etc. Client application sends the "search request" messages 1604 to central controller. Central controller sends a search response message 1605 containing the list of events that match the search criteria. At this time only limited information for each event is sent in the search results as set by each host's preferences for the corresponding event. In Step 1606, Guest A selects one event from the returned list of events.

Still another method for users to get the information about an "Open" event is to scan the barcode of the graphically encoded event identifier by taking a picture or just capturing in the live view from the camera of the mobile device. Client application at the mobile device will then decode the barcode and communicate with the central controller to get more information for the calendar event associated with the decoded event identifier.

The client application sends the event identifier for the selected event along with her user information in a request message to join the associated event to central controller. In step 1607, central controller determines the host of the event associated with the event identifier and based on the preferences for "open" event retrieved from the event database, sends a message 1608 to the client application of the host. Client application of the host accepts the request of Guest A to join the event in step 1609. Client application may either first display the details of Guest A to the host user or instruct the central controller to accept the request automatically depending on the validation of the credentials and/or attributes associated with the user account of Guest A and event preferences set by the event host.

Client application sends a confirm response 1610 to the central controller for Guest A to join the event. In step 1611, central controller updates the guest list associated with the event identifier to include the Guest A and then finds the mobile device(s) for Guest A by looking at the user identifier of Guest A and associated mobile device identifier(s). Central controller sends the confirm response 1612 to all the mobile devices found in the step 1611. Finally, in step 1613, client application displays all the event information to Guest A, and also adds the event to the default calendar application of the mobile electronic device of Guest A.

Figure 17:
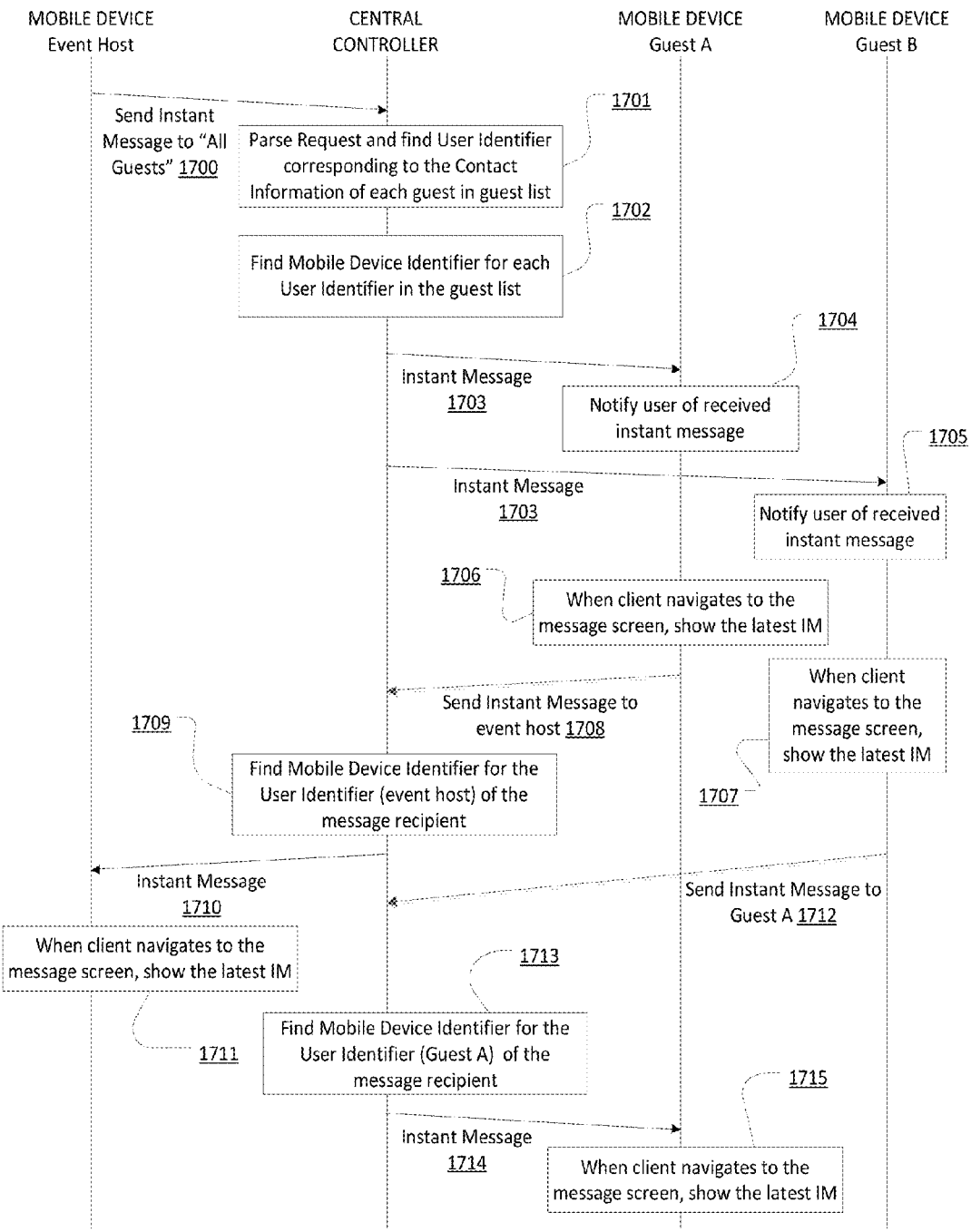
FIG. 17 shows request and response messages in a timing sequence and action steps taken in one embodiment by the users, client application and central controller to send and receive instant message among the participants of a calendar event.
Figure 20:
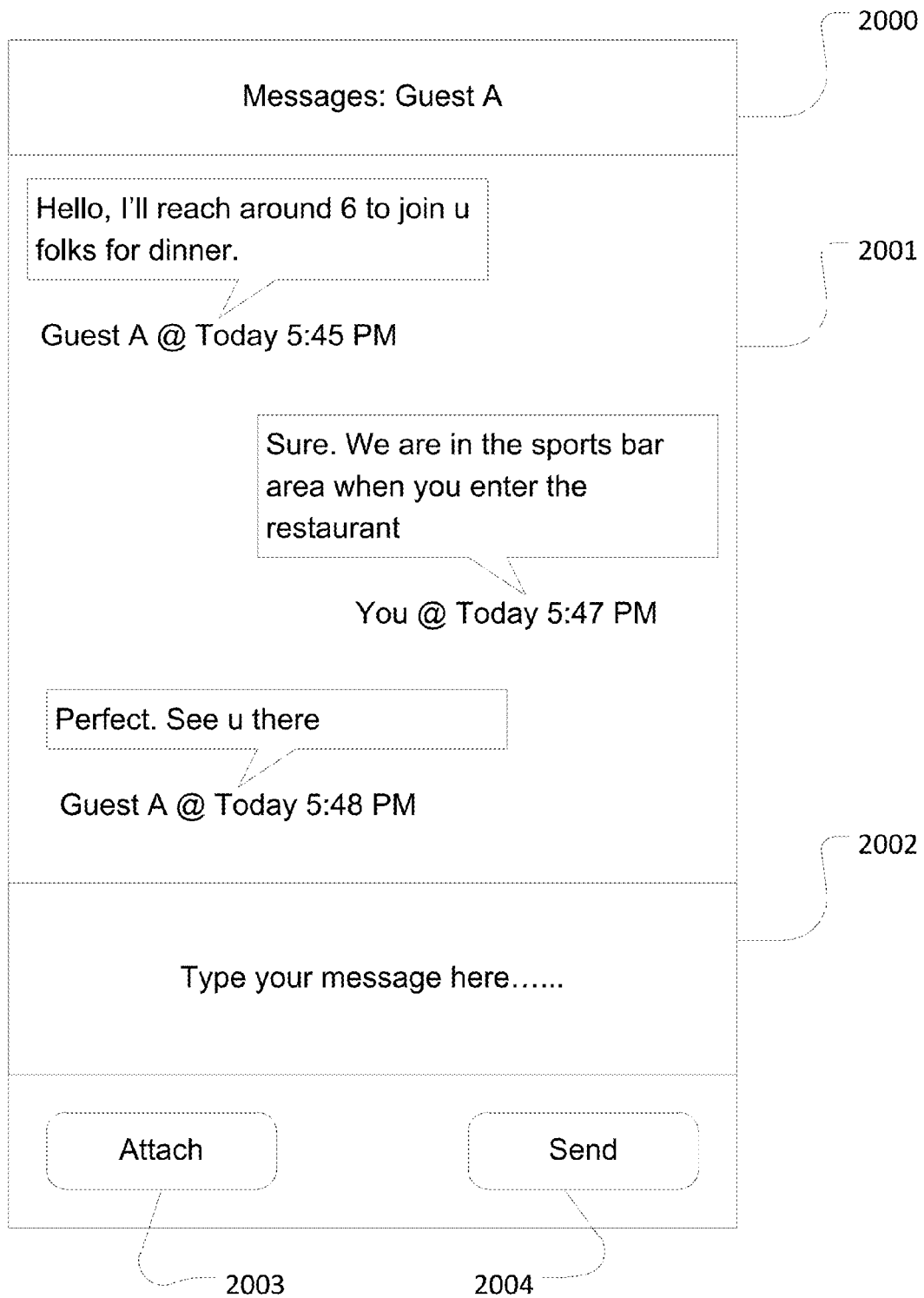
FIG. 20 is an example of the user interface in one embodiment of client application to display the instant messages sent and received by the user in the context of a calendar event from one or more participants of the given calendar event.

FIG. 17 shows the message exchange sequence and actions taken by system entities in one embodiment to enable instant messaging among the participant users of a given event. For example, event host sends a message 1700 to central controller containing a text message and indicates "All Guests" as the recipients of the text message. Message 1700 also contains the user identifier of the host and event identifier of the calendar event in other fields. In step 1701, central controller parses the message and retrieves the guest list associated with the event identifier and then guest user identifier for each guest in the guest list. Central controller, in step 1702, finds the mobile device identifier associated with each guest user identifier and sends a push notification message 1703 containing the text message and other information elements to each said mobile device. Client application on mobile devices decodes the message received from central controller and notifies the respective users about the received instant message as shown in steps 1704 and 1705. Client application may navigate the display to the instant messaging interface of the associated event to display the latest received instant message as shown in steps 1706 and 1707. One example of such interface is shown in FIG. 20.

Guest A can decide to send another instant message to the event host by first sending a message 1708 to central controller. Message 1708 also contains the user identifier of Guest A, event identifier of the calendar event and user information of the host as the recipient of the instant message in other fields. Central controller, in step 1709, finds the mobile device identifiers associated with host user identifier and sends a push notification message 1710 containing the text message and other information elements to each said mobile device. Client application at the host mobile device may navigate the display to the instant messaging interface of the associated event to display the latest received instant message as shown in steps 1711.

Similarly, Guest B can decide to send another instant message to the event host by first sending a message 1712 to central controller. Message 1712 also contains the user identifier of Guest B, event identifier of the calendar event and user information of Guest A as the recipient of the instant message in other fields. Central controller, in step 1713, finds the mobile device identifiers associated with user identifier of Guest A. In step 1713, central controller may also use other methods, for example, validating event preferences to determine if guest communication is allowed, if guest contact information should be included in the instant messages et cetera. Central controller then sends a push notification message 1714 containing the text message and other information elements to each said mobile device. Client application at the mobile device of Guest A may navigate the display to the instant messaging interface of the associated event to display the latest received instant message as shown in steps 1715. It is not necessary for the Guest B to know the contact information of Guest A to send an instant message to her as long as both Guest A and Guest B are participating in the same event using the same event identifier and information fields containing guest preferences for the given event allow Guest A and Guest B to send and receive messages from other event participants.

FIG. 18 shows an example of the client application display in one embodiment to show the calendar events to the user. Field 1800 shows the events that can be selected by the user to show the upcoming events view, month view, week view et cetera. Field 1801 shows the area for listing the calendar event invitations hosted by the user in a concise display format showing the title, start time and end time information fields for the event. Field 1802 is a button area that the user can either select or touch on the mobile device display to view the detail information of the associated event as shown in FIG. 5. Field 1803 shows the area for listing the calendar event invitations received and already seen by the user in a concise display format showing the title, start time and end time information fields for the event. Field 1804 is an indicator icon displayed on the view to indicate that some information elements of the event have been updated since the user last viewed the event details of the associated event. Field 1805 is a button area that the user can either select or touch on the mobile device display to view the detail information of the associated event as shown in FIG. 6. Field 1806 shows the area for listing the calendar event invitations recently received by the user that the user has not viewed so far. When the user deletes an existing event hosted by the user, field area 1801 is updated to delete the event from client application display. When the client application receives a message from the central controller to delete an existing event invitation received by the user for a given event identifier, field area 1803 or 1806 are updated to delete that event from the client application display depending on the area where corresponding event is currently displayed.

FIG. 19 shows one embodiment of the webpage displayed by the central controller when a user enters the link associated with tan event identifier in a web browser such as Internet Explorer, Firefox etc. Webpage 1900 contains various information fields related to the event. Field 1901 shows the title of the event and field 1902 shows the name or other identifying information about the event host. Field 1903 provides information about the location of the event, start time, end time et cetera. Field 1904 shows an example of a response button. Webpage 1900 may contain multiple of such buttons 1904. When a user presses a button to respond, central controller stores the response in its events database and forms a new message containing the event identifier, user identifiers for both sender and receiver.

Field 1905 is an area allocated to display any attachment messages related to the event. In the example shown for one embodiment, field 1905 contains an audio message from the host and field 1905 automatically adapts to the desired information elements in the attachments area. For example, field 1905 displays a simple media player with playback button, stop/pause button and the time remaining indicator. Similarly field 1905 can be adapted to display other audio/visual components. Field 1906 show a map of the event location with a pin showing the exact latitude and longitude of the event location.

FIG. 20 shows one embodiment of the client application interface displayed on the mobile electronic device of the user for sending and receiving user messages (instant messages) among the participant users of a calendar event. Field 2000 contains information about the user(s) who are participating in the instant message exchange. Field 2001 is the area where sent and received messages are displayed. As shown in the example of one embodiment, field 2001 displays the message received along with the information about the sender of that message and the timestamp of receiving that message. Field 2001 also shows an example of the display for sent messages including the timestamp when the message was sent. In another embodiment, field 2001 may not show the guest information related to the received instant messages depending on the guest preferences set in the information fields of the associated event. Field 2002 is an area that displays the message as input by the user before the user sends the message. It may also show any media in this area if the user input any media information using the field 2003 of a button type.

Field 2003 displays a button that user can select to attach various data formats to the message including, but not limited to audio, video, picture, location, song, webpage et cetera. User can either create new data to attach using camera, GPS and microphone in the mobile device, use existing files stored in the memory of mobile device, use online content or use data stored at central controller for sharing within the instant message with other participants of the event. Field 2004 is a button that user can click or touch on the mobile electronic device to finally send the instant message to the recipient(s) displayed in the field 2000.

Figure 21:
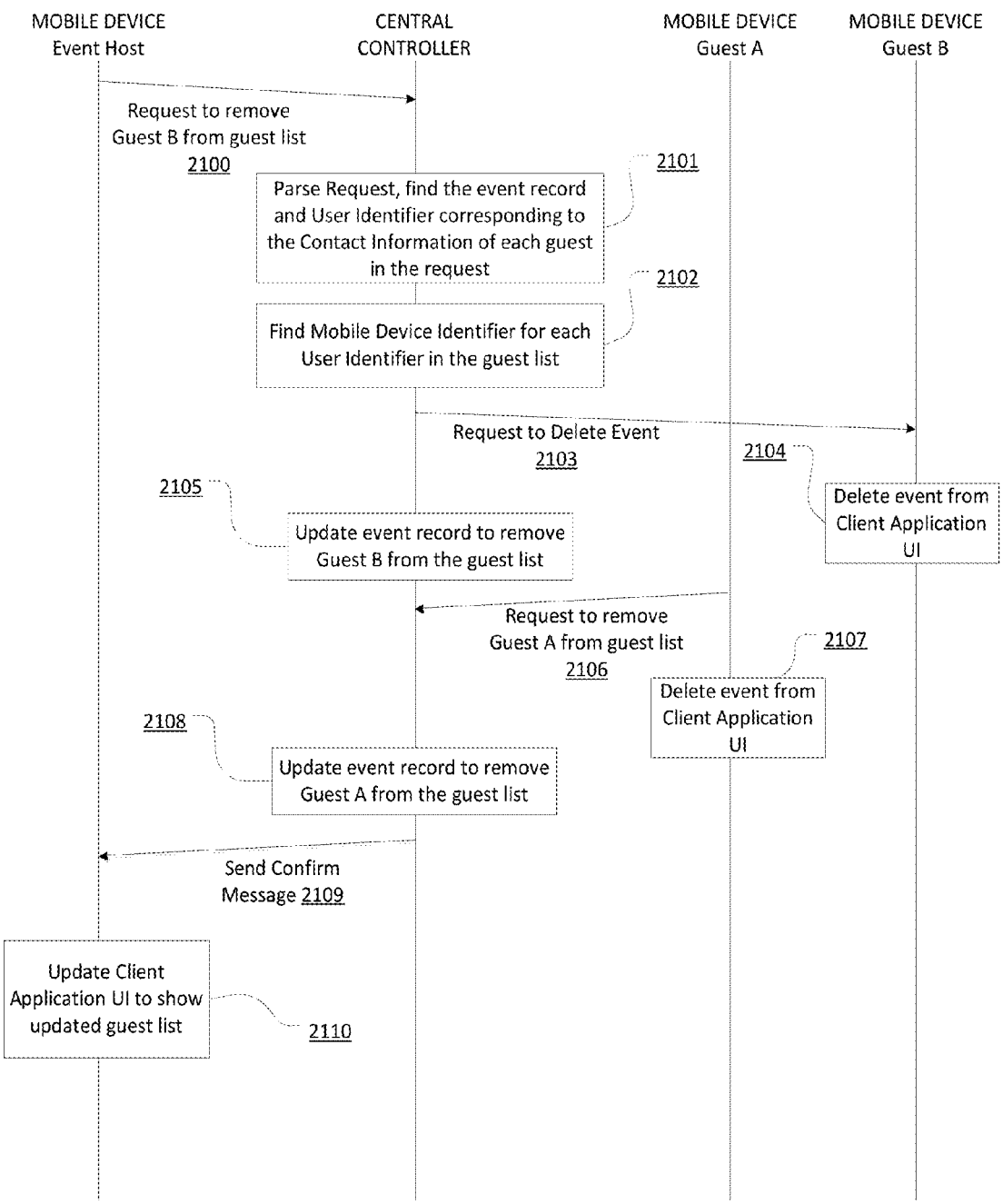
FIG. 21 shows request and response messages in a timing sequence and action steps taken in one embodiment by the users, client application and central controller to remove a guest from the guest list of a particular event.

FIG. 21 shows request and response messages in a timing sequence and action steps taken in one embodiment by the users, client application and central controller to remove a guest from the guest list of a particular event. The client application for event host user sends message 2100 to central controller to delete Guest B from the event list of a particular event as identified by the event identifier contained in the message. In step 2101, central controller parses the message, finds the associated event record from the events database and retrieves the user identifier of Guest B from the corresponding contact information using user database. In step 2102, central controller finds the mobile device identifier associated with the user identifier of Guest B and sends a request message 2103 to the client application for the given mobile device identifier. Client application at the mobile device of Guest B receives the message and invokes the method to delete the event from the client application display in step 2104. In step 2105, central controller updates the associated event record to delete Guest B from the guest list.

FIG. 21 also shows another method for a guest to be deleted from the guest list of a particular event where such request is first originated by the guest user itself. For example a guest user can either decline an event after initially accepting it or may just not prefer to receive any further messages related to a particular event. Similarly a guest user may have initially joined an "open event" but may later decide to leave the event. In such cases client application for the guest, for example Guest A, sends a message 2106 to central controller to remove itself from the guest list of a specific event. Client application for Guest A deletes the event from the display in step 2107. In step 2108, central controller finds the record for the associated event identifier as received in message 2106 and removes Guest A from the guest list. Central controller then sends a message 2109 to the client application of the associated host of the event to confirm that Guest A be deleted from the guest list. In step 2110, client application receives the message, confirms the deletion of the given guests and updates the client application display to show updated list of the guests for the associated event.

Figure 22:
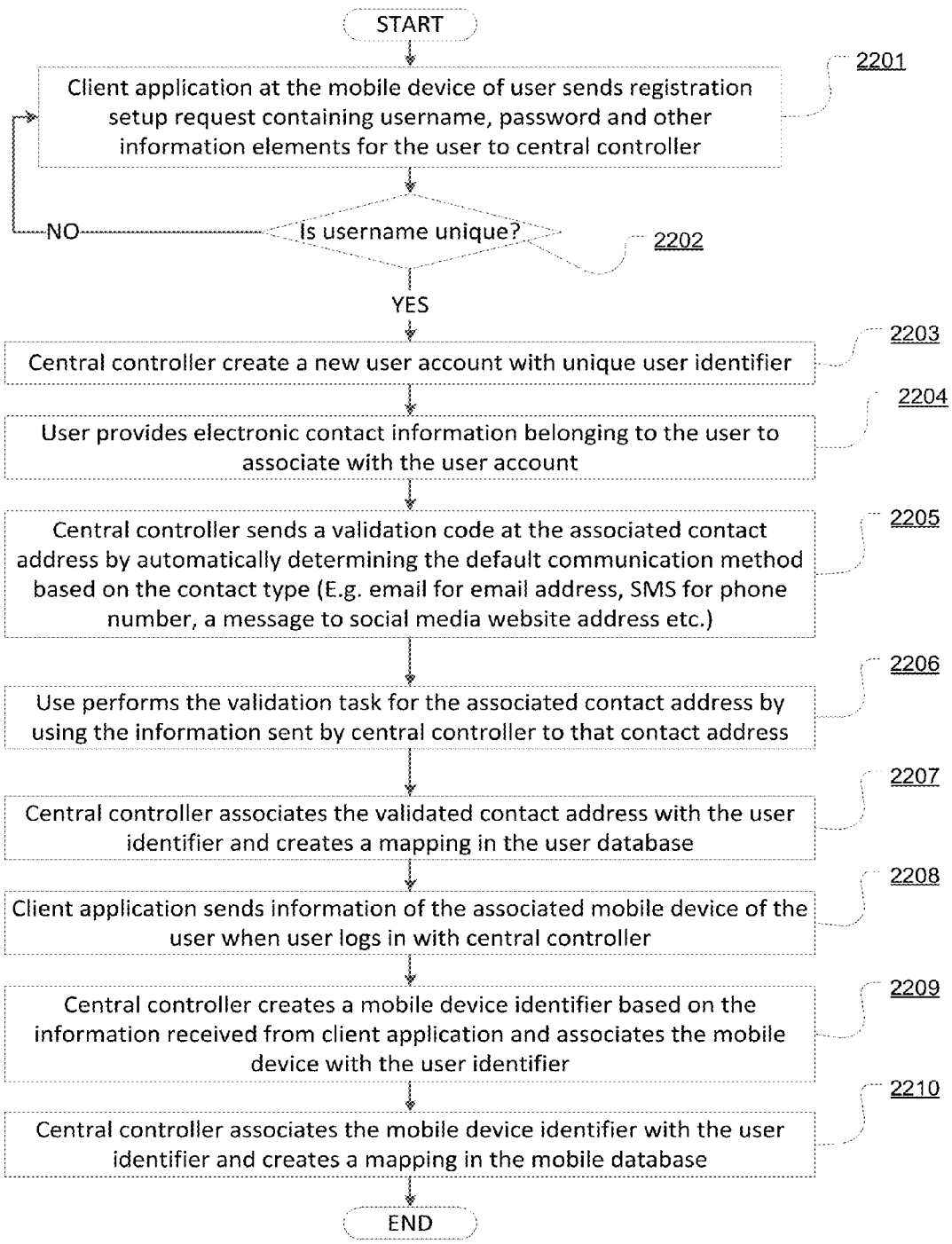
FIG. 22 shows the flow diagram of one embodiment of the action steps taken by the user client application and central controller for registration and login of the user.

FIG. 22 shows an embodiment of the flow diagram for the user to register with central controller and setup an account to interact with other users in the system to exchange, share and synchronize information. In particular, information exchange may be related to sharing media from the mobile device of the user, coordinate an event such as a calendar event and/or share other data as generated by various other devices available on the mobile device, for example, camera, microphone, GPS, gyroscope, heart rate monitor et cetera. A mobile device user having the client application sends identifying information to the central controller in step 2201. Such identifying information includes a username, secret password, mobile device identifier and other information elements. In step 2202, central controller determines if the username already exists in the user database. If the username already exists then central controller sends a message to client application and client application in-turn asks the user to input another username. If the username is unique then central controller create a new account record in user database and creates a unique user identifier for the user account record in step 2203. In step 2204, user provides information about one or more electronic contact addresses that the user wants to associate with the user account. Such contact address may be of various contact types associated with electronic communication in the existing art, for example, e-mail address, wireless phone number, social media service account et cetera.

Further continuing with FIG. 22, in step 2205, central controller automatically determines the communication message format and mechanism to send a validation message to the electronic contact address provided by the user. Such communication mechanism may be to deliver an email to e-mail address contact type, a SMS message to wireless phone number contact type and a post to the account of social media website et cetera. In step 2206, user performs the validation task that may involve either clicking on a website link as provided in the validation message, inputting a validation code in the client application display as provided in the validation message et cetera. Once the central controller successfully validates the user contact information, that contact information is associated with the user account in step 2207. In step 2208, the client application of the user sends the identifying information of the associated mobile device to the central controller when user logs at the central controller. Such identifying information may be the MAC (Media Access Control layer) address, an OEM (Original Equipment Manufacturer) assigned device identifier, an operating system provided device identifier and/or IP (Internet Protocol) address et cetera. Central controller, in step 2209, then may create a unique identifier that maps to the device identifier and stores it in the device database for the given user identifier. Finally, in step 2210 the mobile device associated with such client application and user identifier is stored in the device database. After that, any message received by the central controller for the provided contact information is automatically sent to the client application from where the user has logged-in.

Figure 23:
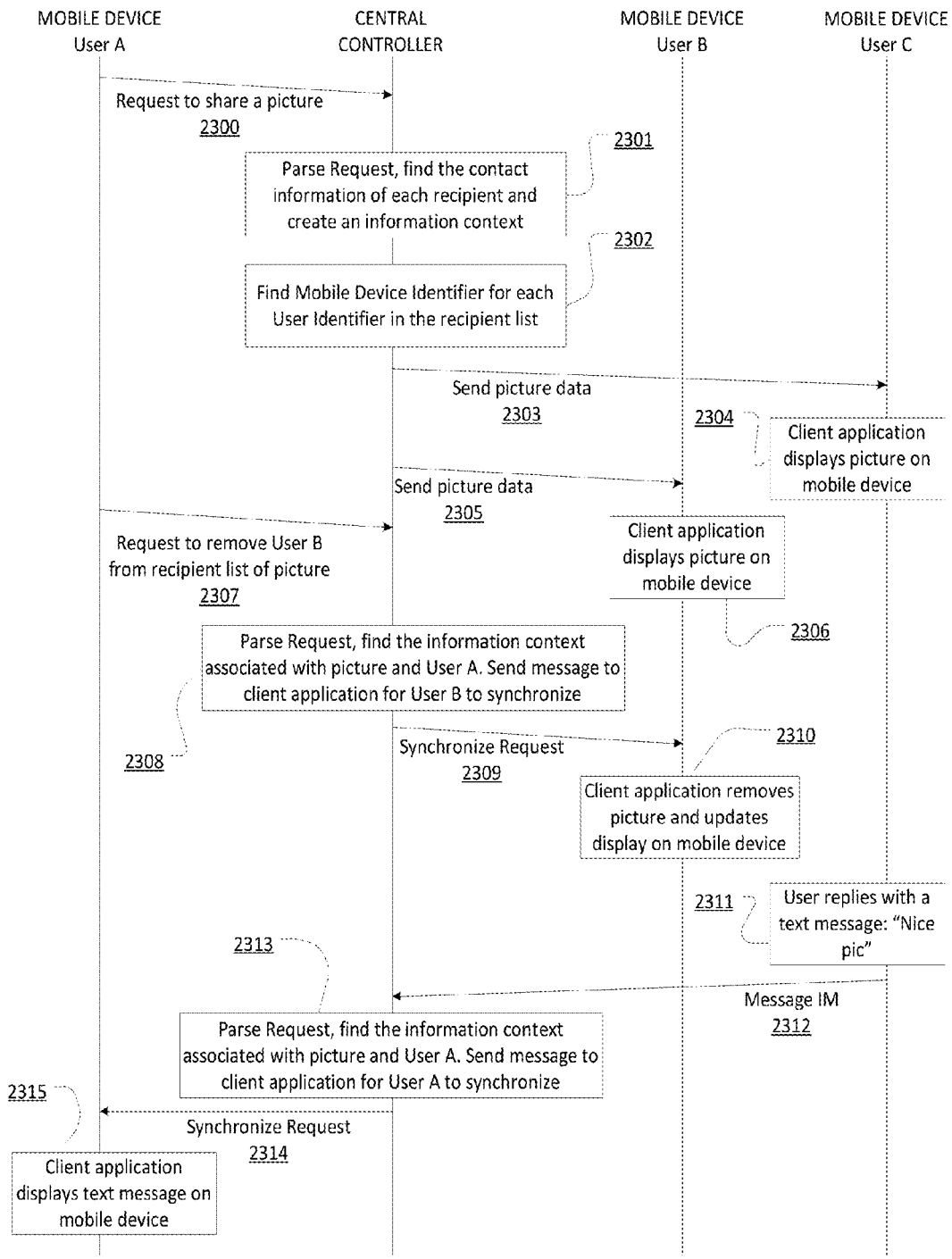
FIG. 23 shows request and response messages in a timing sequence and action steps taken in one embodiment by the users, client application and central controller to share picture data using an information context.

FIG. 23 shows an embodiment of a timing diagram describing message flow and action steps taken by various entities in the system to share data using an information context. First, client application for User A sends a request 2300 to central controller to share a picture. Message 2300 contains information about recipients as Users B and C and picture data such as JPEG (Joint Photography Experts Group), PNG (Portable Network Graphics) et cetera. In step 2301, central controller parses the request, creates a new information context identifier associates with the share request, retrieves the users identifiers for the recipients using their contact information and stores information context in the database. Further, in step 2302, central controller identifies the mobile devices associated with each user identifier using the device database. Central controller then sends messages 2303 and 2305 to the client applications for User B and C respectively. Again message contains sender information, recipient information and the shared picture data along with other fields such as timestamp, information context identifier et cetera. Client applications on user mobile device then updates the display to newly received picture data when client application in launched by the user as shown in action steps 2304 and 2306.

At some time later, User A decides to remove User B from the recipient list of the shared picture and sends a request message 2307 to central controller. Central controller then retrieves the information context associated with User A and the shared picture data in step 2308. Central controller then sends a request message 2309 to the client application of User B to synchronize information for the given information context. In step 2310, client application invokes the process to remove the shared picture data for the given information context from the mobile device of User B and updates the application display also.

Further continuing with FIG. 23, User 'C' decides to send a text message to User 'A' related to the shared picture in step 2311. Client application sends the message 2312 to central controller along with the information context identifier of the shared picture. Central controller, in step 2313 retrieves the user identifier and associated mobile device identifier for User 'A' after parsing the request and retrieving the information context for the given context identifier. Central controller then sends a request message 2314 to the client application of User 'A' to synchronize information for the given information context. Finally, in step 2315, client application for User 'A' updates the user interface to display the received text message from User 'C' when the client application is started by the user.

The user interfaces in the embodiment described here are shown as an example only as related to managing a calendar event as the information context and implementations of user display interface may include other graphical elements to make it more appealing to the users. The client application manages and controls the display of user interfaces and navigation from one interface to another interface on the mobile electronic device in conjunction with the information context and messages received from the central controller and inputs provided by the user.

Various modifications to the disclosed embodiment of user interfaces, data structures and message exchange modality will be apparent to those skilled in the art, and the general principals set forth in the description may be applied to other embodiments and applications as well. User interfaces described here may include additional fields and additional user interfaces may exist to gather user inputs and display information to the users in other embodiments. For example, another user interface may display a wish list of items created by the host that the host wants for event guests to see and bring for the given event. Similarly, data structures and message format may include other information elements and messages. Thus, the present invention is not intended to be limited to the embodiments shown and the inventor regards this invention as any patentable subject matter described herein.

While certain embodiments of the inventions have been described, these embodiments have been presented by the way of example only, and are not intended to limit the scope of the disclosure. Indeed, the novel methods and system described herein may be embodied in a variety of other forms; furthermore, various omissions, substitutions and changes in the form of the methods and systems herein may be made without departing from the spirit of the disclosure. The accompanying claims and their equivalents are intended to cover such forms or modifications as would fall within the scope and spirit of the inventions.

What is claimed is:

1. A method for interactively sharing, synchronizing and controlling shared information across a plurality of mobile devices, comprising the steps of:
deploying a central controller computer coupled to a packet network device comprising a memory and a processor and further comprising programmable code stored in the memory of the computer, the code adapted to sharing, synchronizing, and controlling shared information across a plurality of client applications;
receiving, at the central controller, registrations from the plurality of client applications;
creating, at the central controller, a unique user identifier for each client application;
receiving, at the central controller, a plurality of contact information for each client application;
mapping, at the central controller, the plurality of contact information to the unique user identifier wherein the plurality of contact information comprises at least an email address, a phone number, or a website address belonging to a user corresponding to the unique user identifier;
creating and maintaining, at the central controller, a plurality of unique mobile device identifiers corresponding to the plurality of mobile devices wherein the plurality of client applications run on the plurality of mobile devices, further wherein a first user identifier, corresponding to a first client application, is associated to one or more mobile device identifiers;
receiving, at the central controller, a request from a second client application wherein the central controller creates and maintains an information context identifier for establishing a context for information sharing to facilitate sharing of information between the first client application and the second client application via the central controller;
exchanging, at the central controller, a plurality of request and response messages comprising the first user identifier and a second user identifier for synchronization of information for an established information context between the first client application and a second client application wherein the first user identifier is associated to the first client application and the second user identifier is associated to the second client application;
sending, from the central controller, a notification message to the first client application and the second client application wherein the notification message comprises at least the first user identifier and the second user identifier wherein the first user identifier and the second user identifier are associated to the established information context; and,
creating, updating, or deleting, at the central controller, the information related to the information context for information sharing by the first client application or the second client application,
wherein the central controller automatically formats and sends the request and response messages according to a preferred contact type configured for the first client application wherein the preferred contact type comprises at least an email format, a multimedia message format, or a web communication.

2. The method of claim 1, wherein the plurality of request and response messages comprise at least the first user identifier, the second user identifier, and the information context identifier for establishing a context-based private and secure electronic communication channel between at least the first client application and the second client application.

3. The method of claim 2, wherein the private and secure electronic communication channel is established for an instant message exchange.

4. The method of claim 1, wherein the central controller sends a request to the first client application to display the information on a first mobile device.

5. The method of claim 1, wherein the central controller validates access privileges of the plurality of client applications.

6. The method of claim 1, wherein the central controller receives a request to add, update or delete the contact information associated with the first user identifier.

7. The method of claim 6, wherein the information context relates to a calendar event.

8. The method of claim 7, further wherein the plurality of request and response messages instruct the first client application to create, store, or delete the information related to the information context identifier and the calendar event.

9. A system for interactively sharing, synchronizing and controlling shared information across a plurality of mobile devices comprising:
a central controller computer coupled to a packet network device comprising a memory and a processor and further comprising programmable code stored in the memory of the computer, the code adapted to sharing, synchronizing, and controlling shared information across a plurality of client applications;
a data storage device;
wherein the central controller receives registrations from a plurality of client applications and assigns a unique user identifier and a mobile device identifier to each client application;
wherein the central controller stores user information for a plurality of users in a user account for each user, wherein the plurality of users each correspond to the plurality of client applications, and further wherein the user information includes contact information and further wherein the user account can be associated to one or more mobile device identifiers;

wherein the central controller establishes an information context in response to a first message received from a first client application and stores a unique information context identifier for the information context in the data storage device;

wherein the central controller exchanges a plurality of request and response messages between the first client application and a second client application to establish a private and secure electronic communication channel for interaction between the first client application and the second client application, wherein the request and response messages are associated to an information context;

wherein the central controller exchanges the plurality of request and response messages to synchronize information associated with the information context between the first client application and the second client application;

wherein the central controller sends an instruction to the plurality of client applications that are associated to the information context, wherein the instruction is to display, control, or update information on the plurality of client applications; and, wherein the central controller automatically formats and sends the request and response messages according to a preferred contact type configured for the first client application wherein the preferred contact type comprises at least an email format, a multimedia message format, or a web communication.

10. The system of claim 9, wherein a second message, received at the central controller from the first client application, is from a calendar application and the information context relates to a calendar event identifier to uniquely identify the calendar event within a calendar of a first mobile device.

11. The system of claim 9, wherein the user information comprises at least an email address, a phone number, or a website address.

12. The system of claim 11, wherein a third message, received at the central controller from the first client application, is to dynamically add, update or delete contact information.

13. The system of claim 9, wherein the information context maintained by the central controller is for a shared media wherein the media comprises a picture file, a video file or an audio file.

14. The system of claim 9, wherein the central controller receives an instruction from the first client application to add a third user identifier to the information context identifier.

15. The system of claim 9, wherein the central controller receives an instruction from the first client application to remove a second user identifier from the information context identifier.

16. The system of claim 15, wherein central controller instructs the second client application to remove the information associated with the information context identifier wherein the second client identifier is associated to the second client application.

* * * * *